(12) United States Patent
Adriani et al.

(10) Patent No.: US 10,365,015 B2
(45) Date of Patent: Jul. 30, 2019

(54) ROTATABLE SUPPORT SYSTEMS FOR PHOTOVOLTAIC MODULES AND METHODS THEREOF

(71) Applicant: Alion Energy, Inc., Richmond, CA (US)

(72) Inventors: Paul Adriani, Palo Alto, CA (US); Neil Morris, Livermore, CA (US); Kevin Hennessy, Walnut Creek, CA (US); Anders Swahn, Tiburon, CA (US); Thomas Peter Hunt, Oakland, CA (US); Luis Francisco Castro Hernandez, Richmond, CA (US)

(73) Assignee: Alion Energy, Inc., Richmond, CA (US)

( * ) Notice: Subject to any disclaimer, the term of this patent is extended or adjusted under 35 U.S.C. 154(b) by 0 days.

(21) Appl. No.: 15/487,256

(22) Filed: Apr. 13, 2017

(65) Prior Publication Data

US 2017/0314819 A1 Nov. 2, 2017

Related U.S. Application Data

(63) Continuation of application No. 13/892,140, filed on May 10, 2013, now Pat. No. 9,657,967.

(60) Provisional application No. 61/647,991, filed on May 16, 2012.

(51) Int. Cl.
*H01S 4/00* (2006.01)
*F24S 25/61* (2018.01)
*F24S 25/10* (2018.01)
*F24S 25/11* (2018.01)
*H02S 20/00* (2014.01)
(Continued)

(52) U.S. Cl.
CPC ............... *F24S 25/61* (2018.05); *F24S 25/10* (2018.05); *F24S 25/11* (2018.05); *H02S 20/00* (2013.01); *H02S 20/30* (2014.12); *F24S 2025/012* (2018.05); *F24S 2025/014* (2018.05); *Y02E 10/47* (2013.01); *Y02E 10/50* (2013.01); *Y10T 29/49002* (2015.01)

(58) Field of Classification Search
CPC .......... F24J 2/523; F24J 2/5237; F24J 2/5245; F24J 2002/5277; F24J 2002/5281; F24S 25/61; H01L 31/18; H02S 20/00; H02S 20/30
See application file for complete search history.

(56) References Cited

U.S. PATENT DOCUMENTS 8,341,895 B2 * 1/2013 Schwarze ............... F24J 2/5239
136/244
2010/0269891 A1 * 10/2010 Kinard ............... H01L 31/02008
136/251
(Continued)

*Primary Examiner* — Paul D Kim
(74) *Attorney, Agent, or Firm* — Jones Day

(57) ABSTRACT

Rotatable support system for mounting one or more photovoltaic modules and method thereof. The system includes a stiffener configured to be attached to the one or more photovoltaic modules, a column connected to the stiffener through at least a rotatable component, and a foot connected to the column. The column is configured to rotate from a folded position towards an unfolded position, and stop at the unfolded position separated from the folded position by an angle difference. The angle difference represents the maximum range of rotation for the column.

18 Claims, 24 Drawing Sheets

(51) Int. Cl.
*H02S 20/30* (2014.01)
*F24S 25/00* (2018.01)

(56) References Cited

U.S. PATENT DOCUMENTS

| | | | | |
|---|---|---|---|---|
| 2011/0309215 A1* | 12/2011 | Lu | ............................ | F24S 25/12 |
| | | | | 248/165 |
| 2013/0139869 A1* | 6/2013 | Nuernberger | ........... | H02S 20/00 |
| | | | | 136/251 |

* cited by examiner

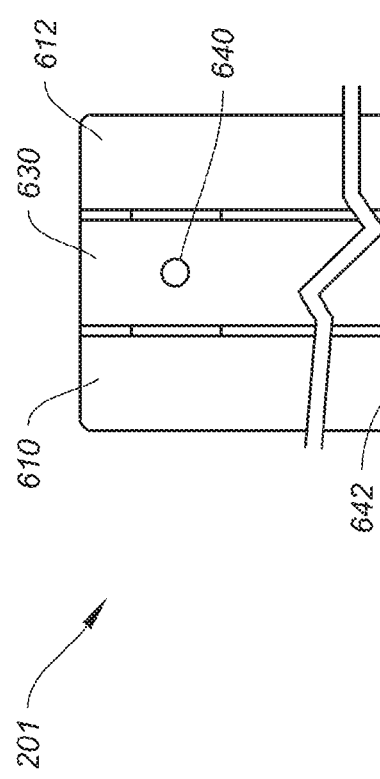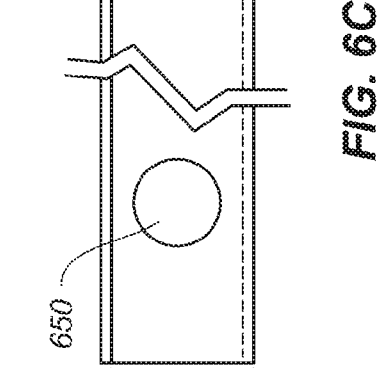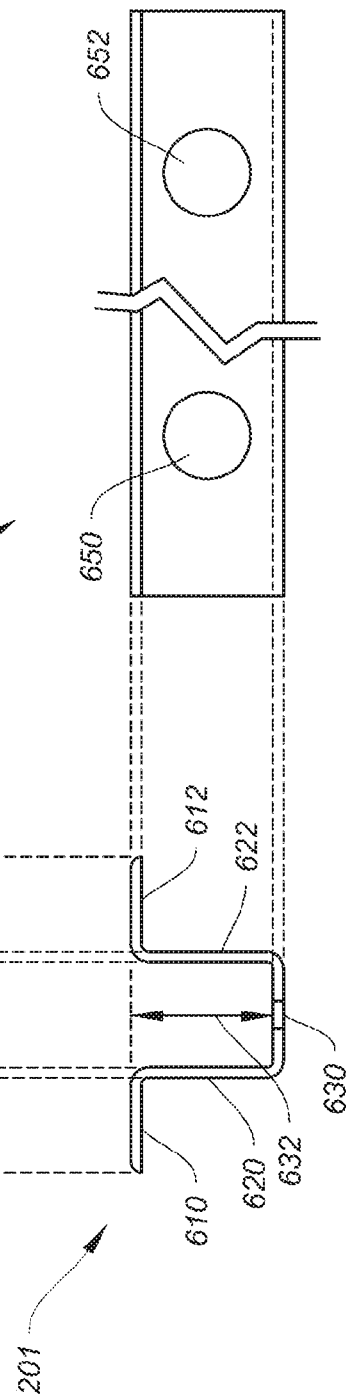

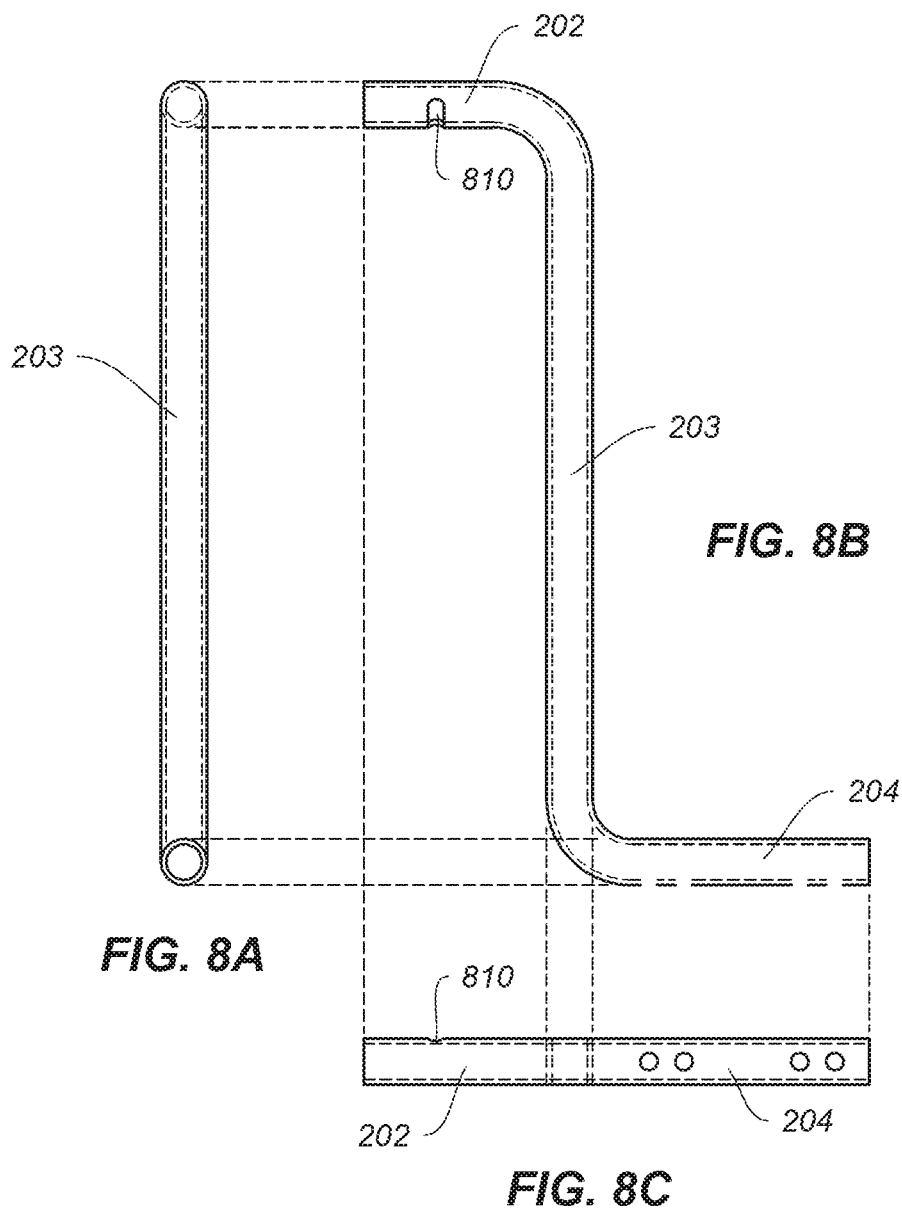

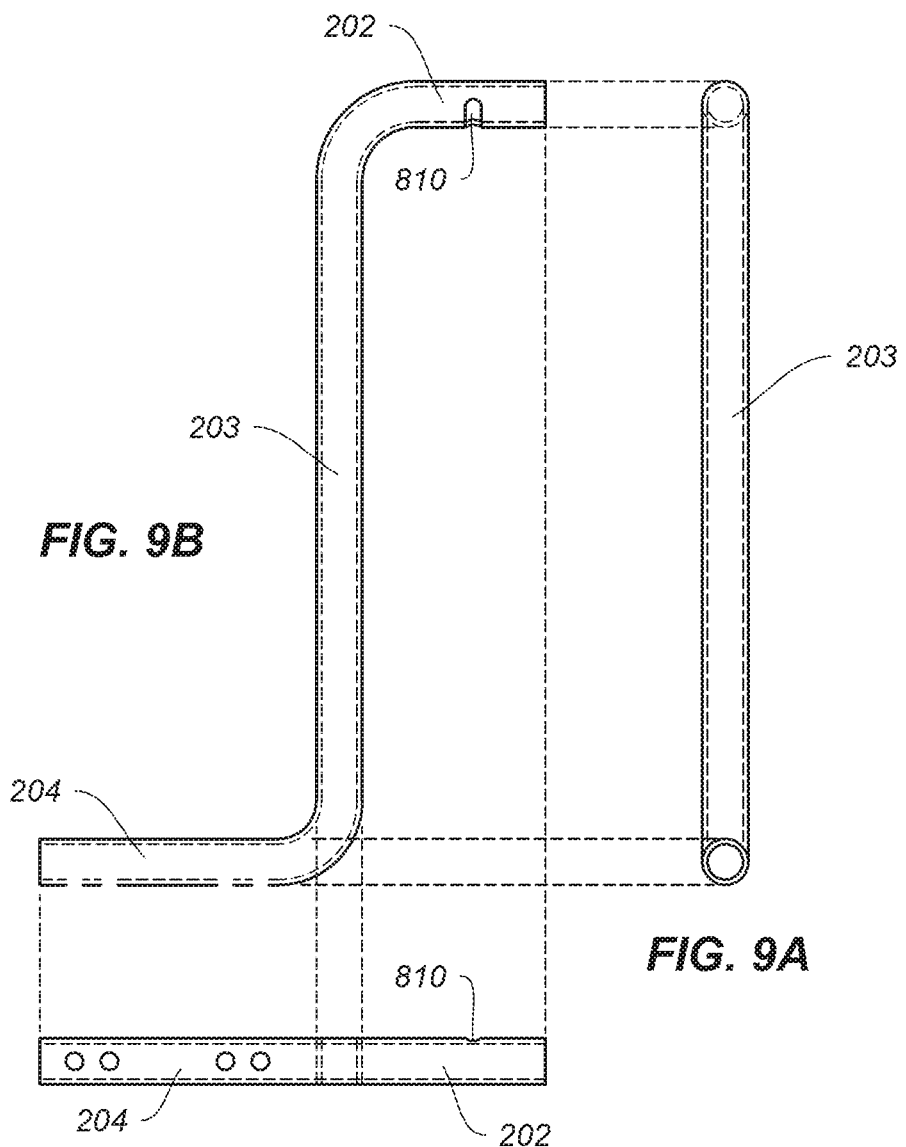

ROTATABLE SUPPORT SYSTEMS FOR PHOTOVOLTAIC MODULES AND METHODS THEREOF

1. CROSS-REFERENCES TO RELATED APPLICATIONS

This application is a continuation under 35 U.S.C. § 120 of U.S. patent application Ser. No. 13/892,140, filed May 10, 2013 now U.S. Pat. No. 9,657,967, and entitled "Rotatable Support Systems for Photovoltaic Modules and Methods Thereof," which claims priority to U.S. Provisional Application No. 61/647,991, filed May 16, 2012, both of which applications are commonly assigned, the entire contents of both of which applications being incorporated by reference herein for all purposes.

Additionally, this application is related to U.S. patent application Ser. No. 13/091,960, commonly assigned, incorporated by reference herein for all purposes.

2. BACKGROUND OF THE INVENTION

The present invention is directed to photovoltaic systems. More particularly, the invention provides systems and methods for mounting photovoltaic modules. Merely by way of example, the invention has been applied to supporting photovoltaic modules with a predetermined tilt. But it would be recognized that the invention has a much broader range of applicability.

Photovoltaics convert sunlight into electricity, providing a desirable source of clean energy. FIG. 1 is a simplified diagram of a conventional photovoltaic array. The photovoltaic array 100 includes strings 1, 2, 3, 4, . . . n, where n is a positive integer larger than or equal to 1. Each string includes photovoltaic (PV) modules (e.g., solar panels) that are connected in series. The photovoltaic array 100 is connected to a central inverter 110, which provides an alternating current (AC) connection to a power grid 120.

The installation of photovoltaic arrays often presents logistical challenges. For example, some conventional mounting systems hold photovoltaic modules (e.g., solar panels) at a fixed tilt toward the equator with a tilt angle from the horizon that is approximately equal to the latitude of the photovoltaic arrays. Often, these mounting systems are assembled by hand in the field from metal components; therefore, assembling these mounting systems usually are expensive and labor intensive. The mounting systems often need to withstand harsh outdoor conditions and mechanical loads for a significant period of time, such as 20 years or more.

Hence, it is highly desirable to improve techniques for the mounting of PV modules.

3. BRIEF SUMMARY OF THE INVENTION

The present invention is directed to photovoltaic systems. More particularly, the invention provides systems and methods for mounting photovoltaic modules. Merely by way of example, the invention has been applied to supporting photovoltaic modules with a predetermined tilt. But it would be recognized that the invention has a much broader range of applicability.

According to one embodiment, a rotatable support system for mounting one or more photovoltaic modules includes a stiffener configured to be attached to the one or more photovoltaic modules, a column connected to the stiffener through at least a rotatable component, and a foot connected to the column. The column is configured to rotate from a folded position towards an unfolded position, and stop at the unfolded position separated from the folded position by an angle difference. The angle difference represents the maximum range of rotation for the column.

According to another embodiment, a rotatable support system for mounting one or more photovoltaic modules includes a first stiffener configured to be attached to a photovoltaic module, a first column connected to the first stiffener through at least a first rotatable component, a first foot connected to the first column, a second column connected to the first stiffener through at least a second rotatable component, a second foot connected to the second column, a second stiffener configured to be attached to the photovoltaic module, a third column connected to the second stiffener through at least a third rotatable component, a third foot connected to the third column, a fourth column connected to the second stiffener through at least a fourth rotatable component, and a fourth foot connected to the fourth column. The first column is configured to rotate from a first folded position towards a first unfolded position, and stop at the first unfolded position separated from the first folded position by a first angle difference. The first angle difference represents the first maximum range of rotation for the first column. Additionally, the second column is configured to rotate from a second folded position towards the second unfolded position, and stop at the second unfolded position separated from the second folded position by a second angle difference. The second angle difference represents the second maximum range of rotation for the second column. Moreover, the third column is configured to rotate from a third folded position towards a third unfolded position, and stop at the third unfolded position separated from the third folded position by a third angle difference. The third angle difference represents the third maximum range of rotation for the third column. Also, the fourth column is configured to rotate from a fourth folded position towards a fourth unfolded position, and stop at the fourth unfolded position separated from the fourth folded position by a fourth angle difference. The fourth angle difference represents the fourth maximum range of rotation for the fourth column. The first column and the second column are different in length, the third column and the fourth column are different in length, the first column and the third column are the same in length, and the second column and the fourth column are the same in length. The first angle difference and the third angle difference are the same in magnitude, and the second angle difference and the fourth angle difference are the same in magnitude.

According to yet another embodiment, a method for mounting one or more photovoltaic modules includes attaching a photovoltaic module to a stiffener. The stiffener is a part of a rotatable support system further including a column and a foot connected to the column. Additionally, the method includes attaching the column to the stiffener through at least a rotatable component, placing the column in a folded position, moving the photovoltaic module with the rotatable support system to an installation location, rotating the column from the folded position towards an unfolded position, and stopping the column at the unfolded position separated from the folded position by an angle difference. The angle difference represents the maximum range of rotation for the column.

Depending upon the embodiment, one or more benefits may be achieved. These benefits and various additional objects, features, and advantages of the present invention can be fully appreciated with reference to the detailed description and accompanying drawings that follow.

4. BRIEF DESCRIPTION OF THE DRAWINGS

FIG. 6A is a simplified diagram showing a top view of the stiffener, FIG. 6B is a simplified diagram showing a cross-section view of the stiffener, and FIG. 6C is a simplified diagram showing a side view of the stiffener as part of the rotatable support system for mounting one or more photovoltaic modules according to certain embodiments of the present invention.

FIGS. 8A-8C are simplified diagrams showing side views of the spacer as part of the rotatable support system for mounting one or more photovoltaic modules according to certain embodiments of the present invention, and FIGS. 9A-9C are simplified diagrams showing side views of the spacer as part of the rotatable support system for mounting one or more photovoltaic modules according to some embodiments of the present invention.

Figure 10:
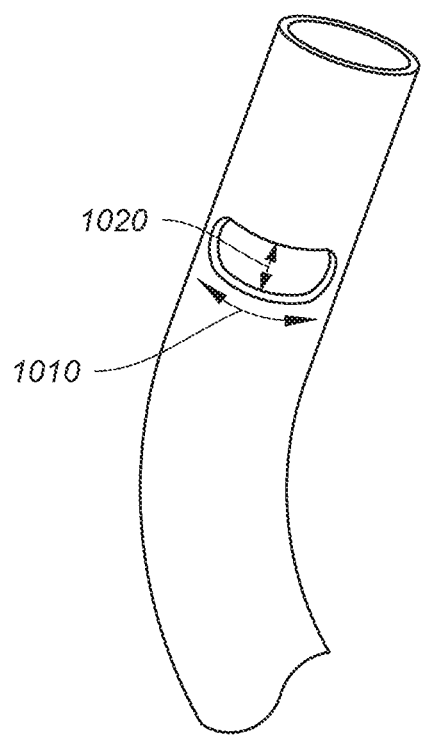

FIG. 10 is a simplified diagram showing the groove of the rotatable component as part of the rotatable support system for mounting one or more photovoltaic modules according to one embodiment of the present invention.

Figure 11:
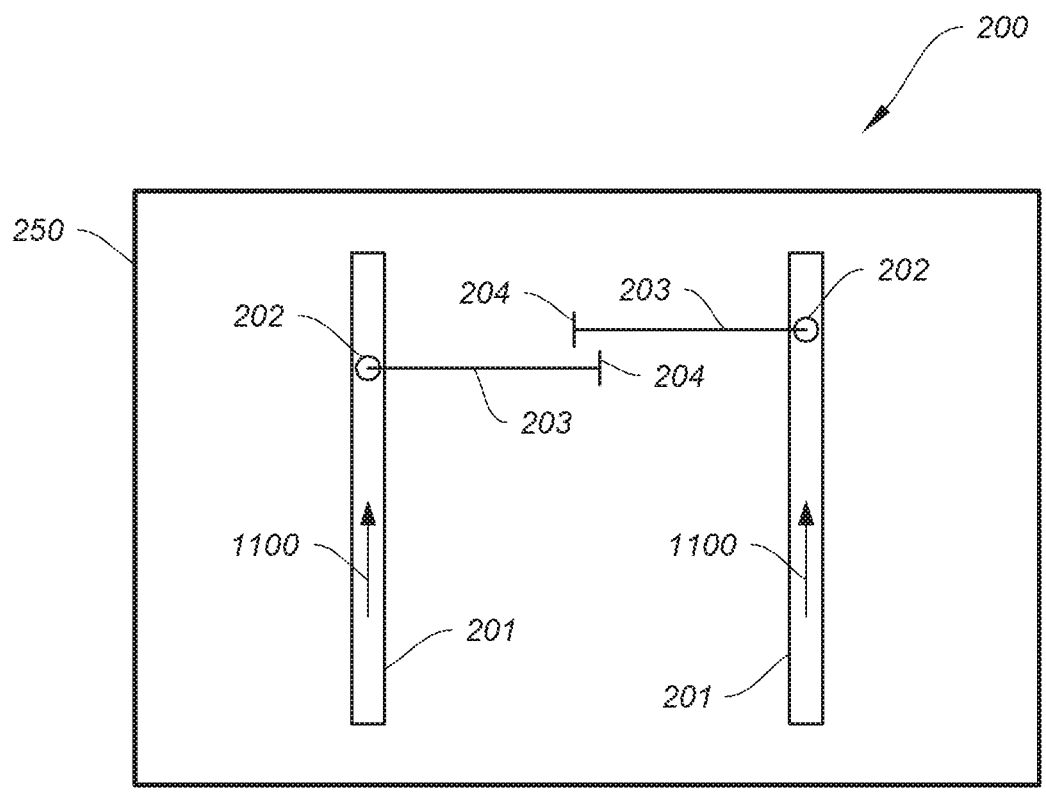

FIG. 11 is a simplified diagram showing the rotatable support system for mounting one or more photovoltaic modules in a folded position according to yet another embodiment of the present invention.

Figure 12A:
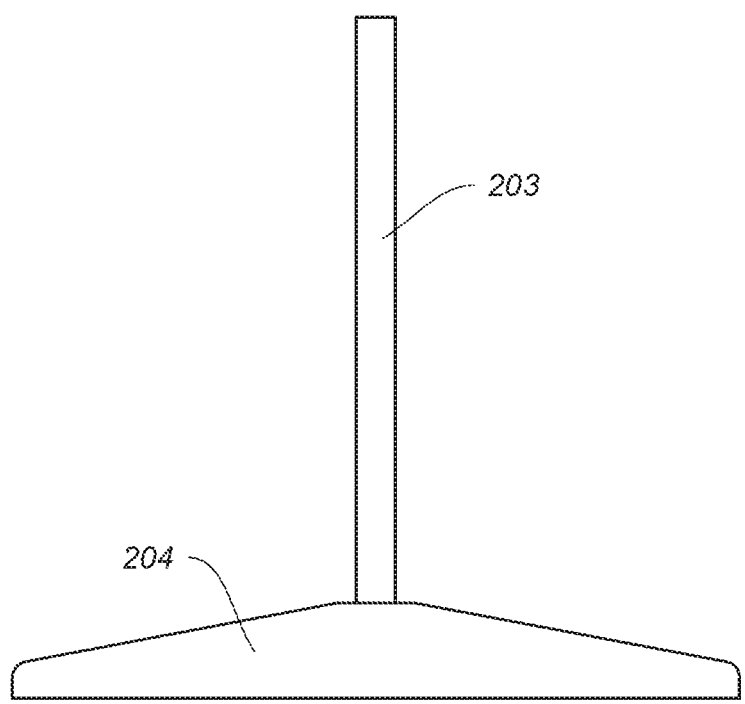
Figure 12B:
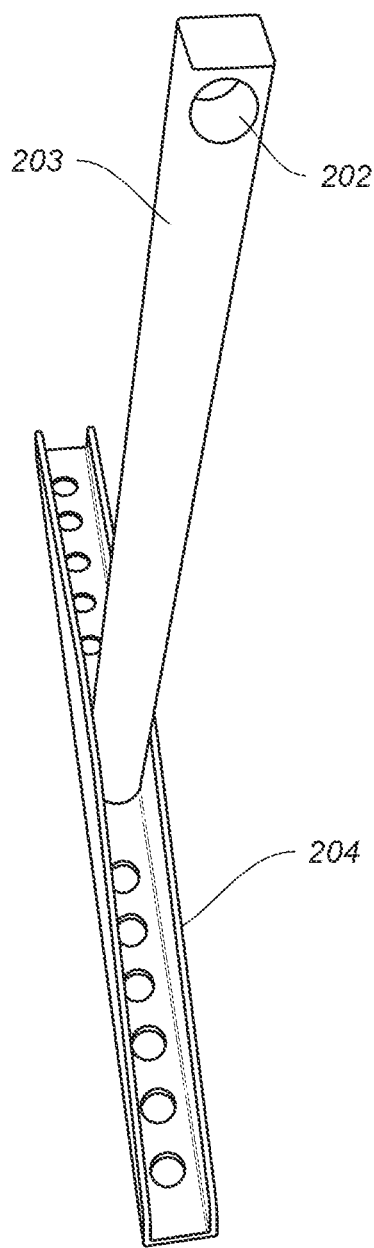

FIGS. 12A-12B are simplified diagrams showing the spacer as part of the rotatable support system for mounting one or more photovoltaic modules according to certain embodiments of the present invention.

Figure 13:
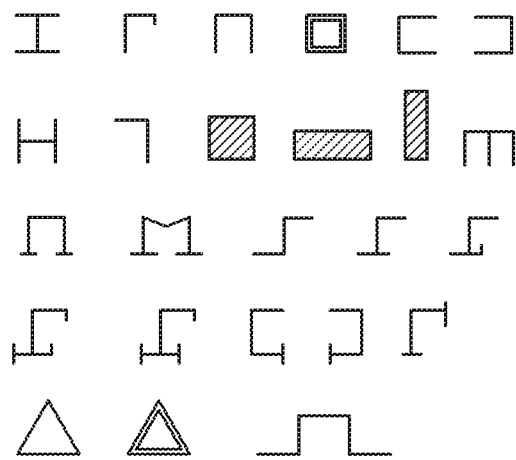

FIG. 13 shows simplified diagrams for various shapes of the stiffener as part of the rotatable support system for mounting one or more photovoltaic modules according to certain embodiments of the present invention.

Figure 14:
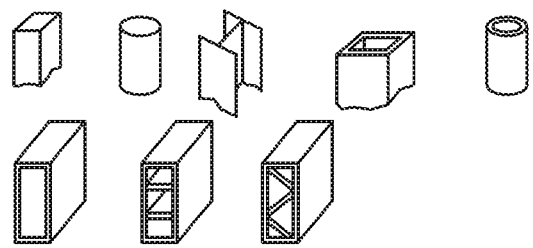

FIG. 14 shows simplified diagrams for various shapes of the column as part of the rotatable support system for mounting one or more photovoltaic modules according to some embodiments of the present invention.

Figure 15:
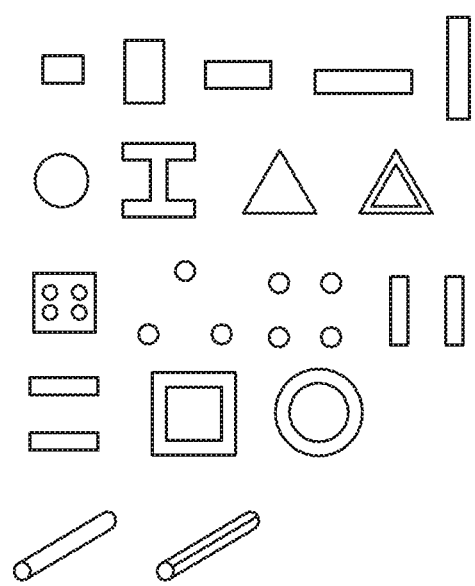

FIG. 15 shows simplified diagrams for various shapes of the foot as part of the rotatable support system for mounting one or more photovoltaic modules according to certain embodiments of the present invention.

Figure 16:
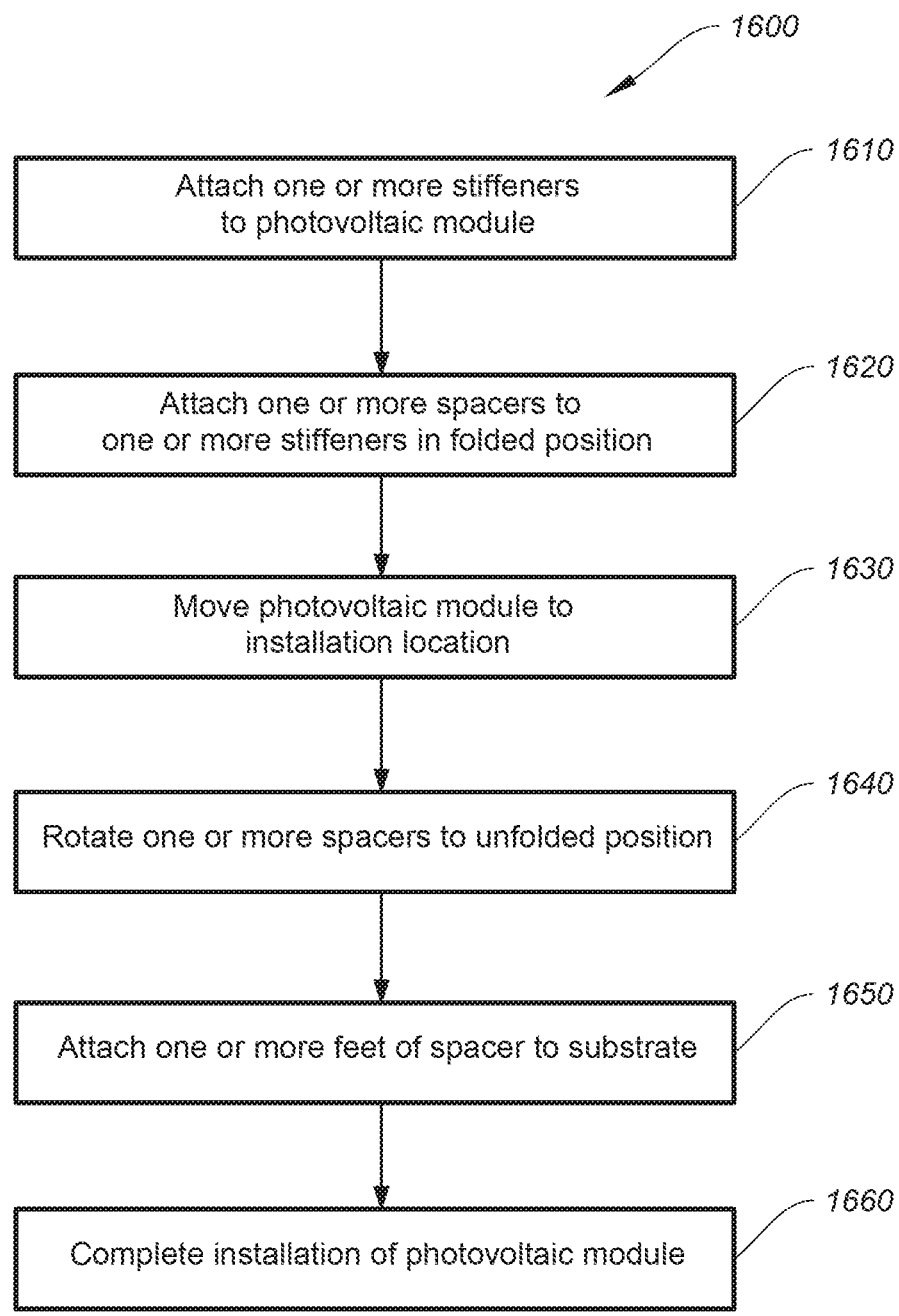

FIG. 16 is a simplified diagram showing a method for installing the photovoltaic module using the rotatable support system according to an embodiment of the present invention.

FIGS. 17A-17E are simplified diagrams showing the process of rotating one or more spacers from folded position to unfolded position and the process of attaching one or more feet of each of one or more spacers to substrate as parts of the method for installing the photovoltaic module using the rotatable support system according to certain embodiments of the present invention.

Figure 18:
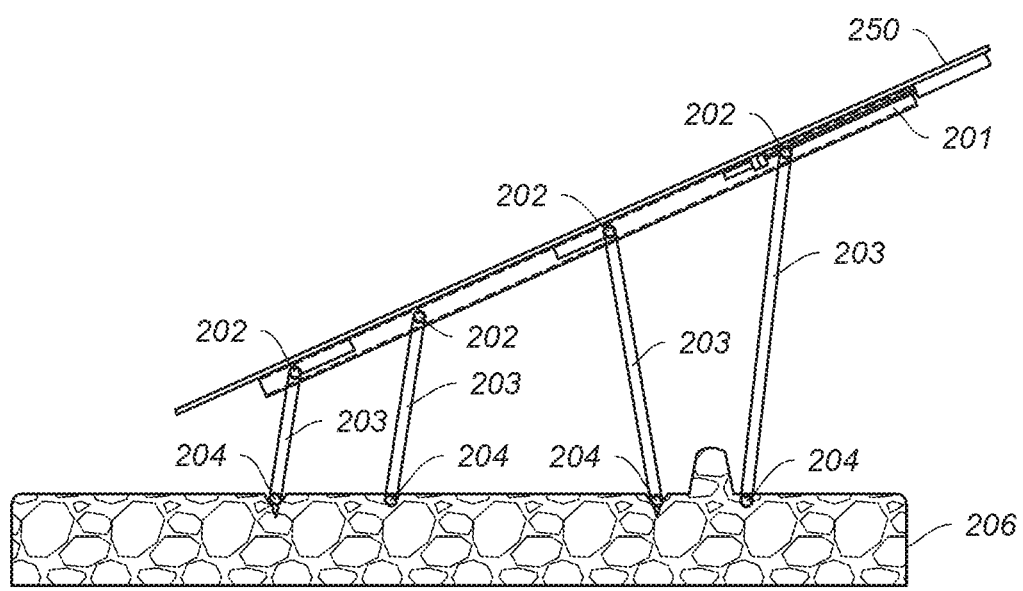

FIG. 18 is a simplified diagram showing the rotatable support system for mounting one or more photovoltaic modules in a unfolded and mounted position according to yet another embodiment of the present invention.

Figure 1:
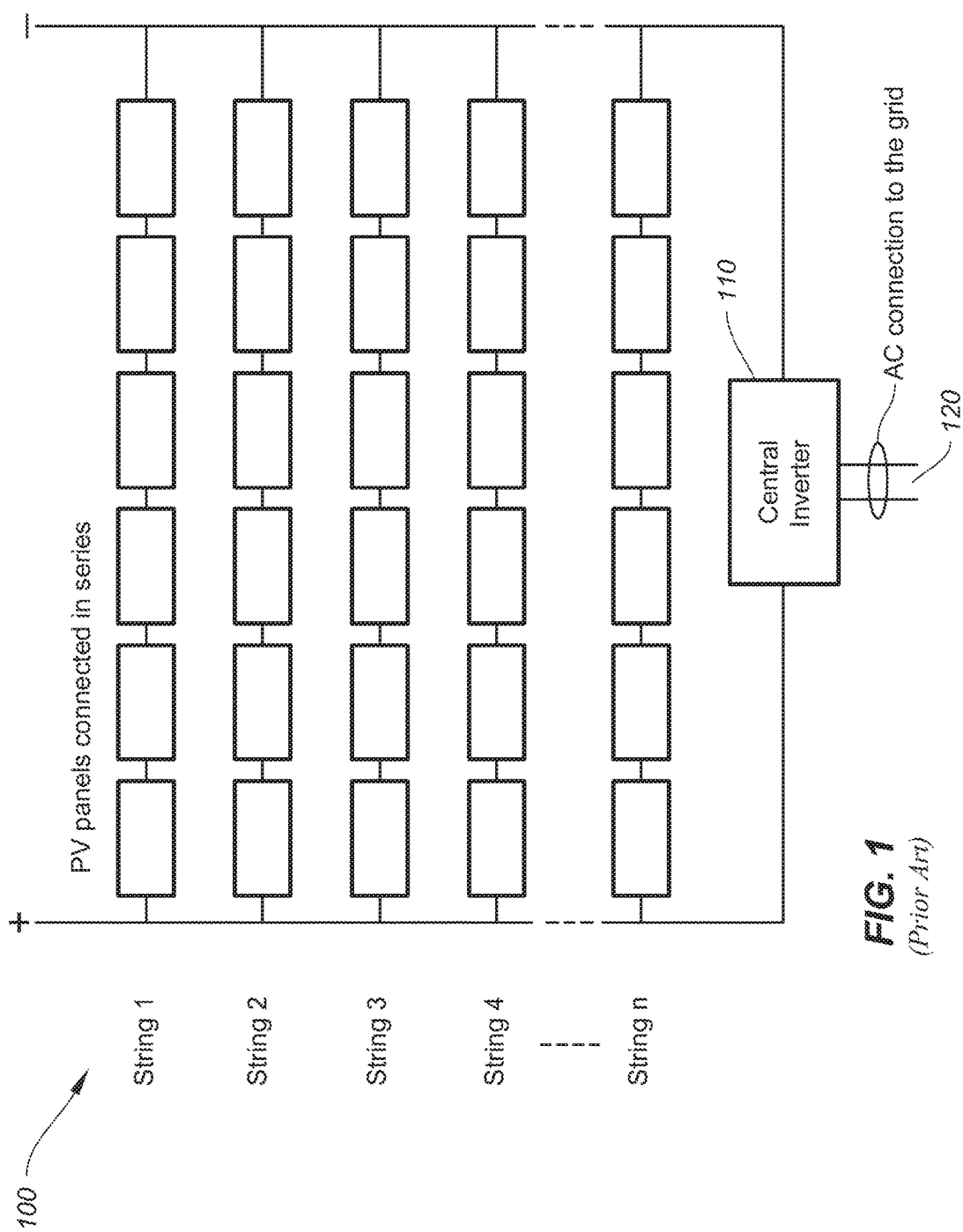
FIG. 1 is a simplified diagram of a conventional photovoltaic array.
Figure 2A:
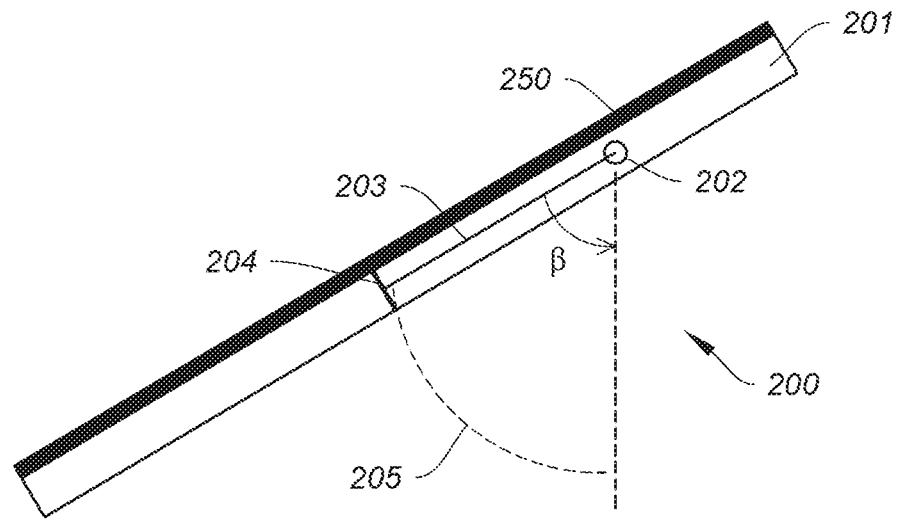
FIG. 2A is a simplified diagram showing a rotatable support system for mounting one or more photovoltaic modules in a folded position.
Figure 2B:
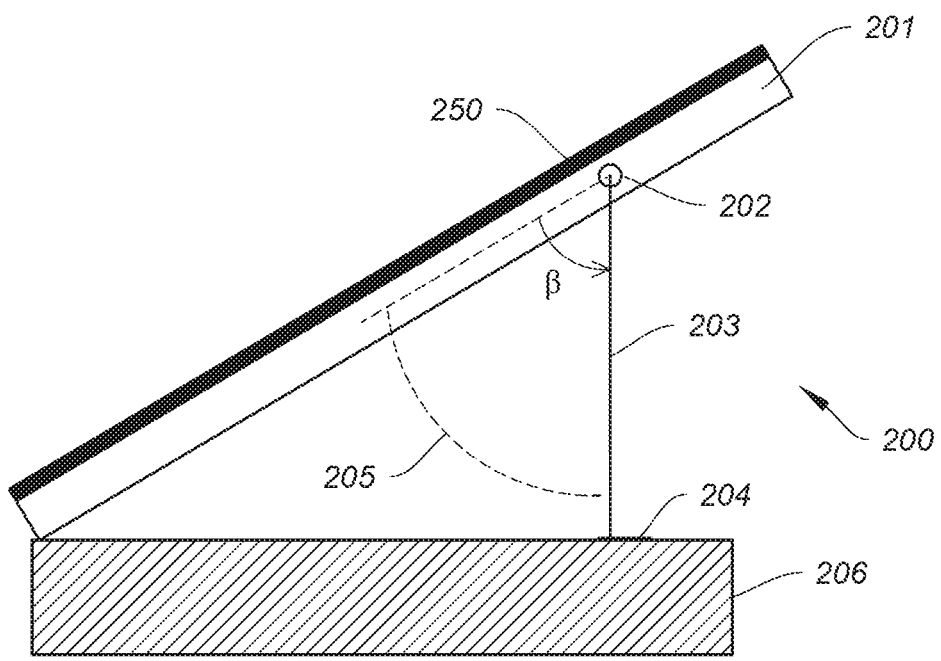
FIG. 2B is a simplified diagram showing the rotatable support system for mounting one or more photovoltaic modules in a unfolded and mounted position, according to some embodiments of the present invention.
Figure 19A:
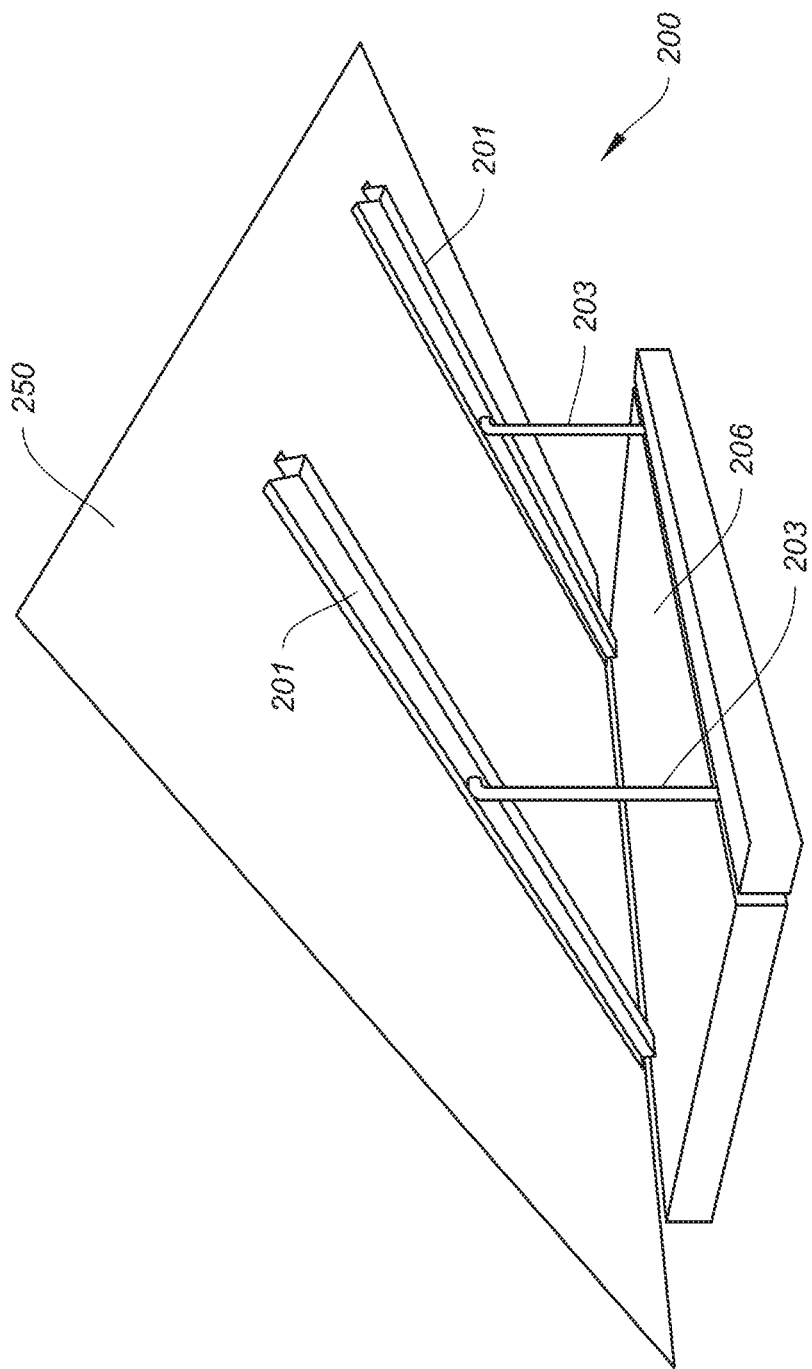
Figure 19B:
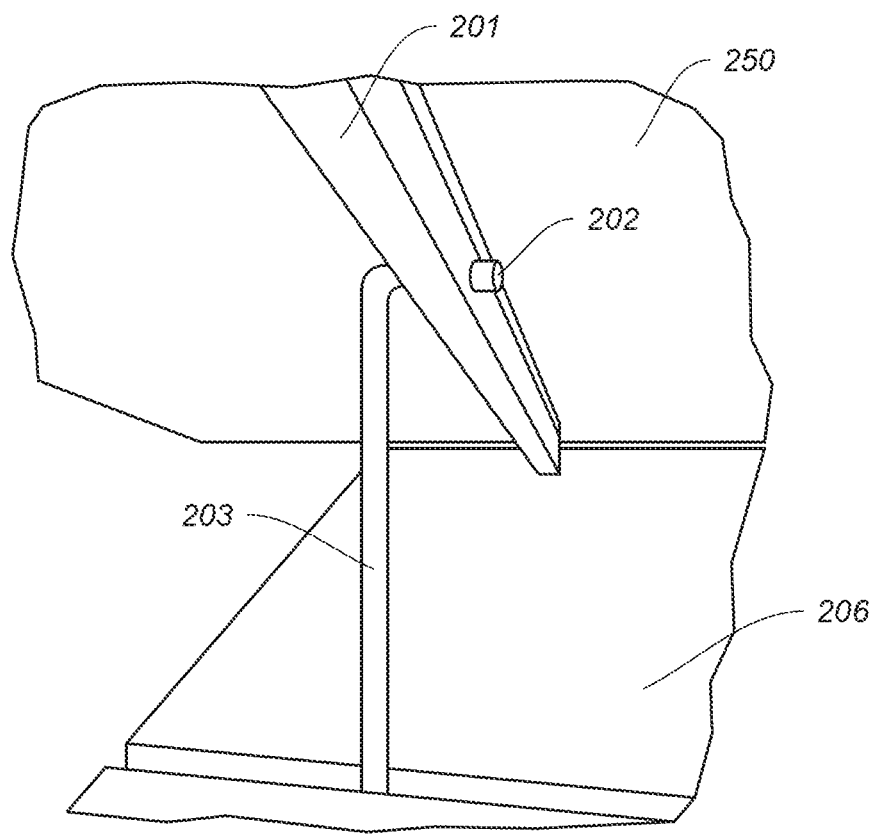

FIGS. 19A-19B are simplified diagrams showing the rotatable support system for mounting one or more photovoltaic modules in a unfolded and mounted position as shown in FIG. 2B according to certain embodiments of the present invention.

5. DETAILED DESCRIPTION OF THE INVENTION

The present invention is directed to photovoltaic systems. More particularly, the invention provides systems and methods for mounting photovoltaic modules. Merely by way of example, the invention has been applied to supporting photovoltaic modules with a predetermined tilt. But it would be recognized that the invention has a much broader range of applicability.

FIG. 2A is a simplified diagram showing a rotatable support system for mounting one or more photovoltaic modules in a folded position, and FIG. 2B is a simplified diagram showing the rotatable support system for mounting one or more photovoltaic modules in a unfolded and mounted position, according to some embodiments of the present invention. These diagrams are merely examples, which should not unduly limit the scope of the claims. One of ordinary skill in the art would recognize many variations, alternatives, and modifications.

As shown in FIG. 2A, the rotatable support system 200 includes one or more stiffeners 201 and one or more spacers. In one embodiment, the rotatable support system 200 is configured to support a photovoltaic module 250 (e.g., a solar panel). In another embodiment, each of the one or more spacers includes a rotatable component 202, a column 203, and a foot 204. For example, the column 203 and the foot 204 of the same spacer form a T shape. In another example, each of the stiffeners 201 includes a module frame attached to the photovoltaic module 250 (e.g., a solar panel), and/or one or more beams that are attached to the photovoltaic module 250 (e.g., being bonded to the back of the solar panel 250).

According to one embodiment, each of the stiffeners 201 is made of aluminum, polymer, and/or roll-formed steel. For example, each of the stiffeners 201 is coated with one or more protective coatings (e.g., a protective coating that is durable outdoors for 20 years or more). In another example, each of the stiffeners 201 is coated for electrical safety with one or more non-conductive materials (e.g., PVC and/or EPDM).

According to another embodiment, each of the one or more stiffeners 201 includes one or more holes and/or one or more brackets. For example, the one or more holes and/or the one or more brackets form at least a portion of the rotatable component 202. In another example, the rotatable component 202 includes a bushing and/or a bearing to improve ease of rotation and/or increase the mechanical load that the rotatable component 202 can support. In yet another example, the rotatable component 202 provides sufficient rotational friction to stay immobile during shipping of the photovoltaic module 250 that is attached to the rotatable support system 200.

In one embodiment, the column 203 is attached to the rotatable component 202. For example, the rotatable component 202 can rotate freely with the weight of the column 203 due to gravity. In another example, the rotatable component 202 has sufficient friction to necessitate physical force to rotate the column 203. In yet another example, the column 203 is held in place during shipping with friction between the column 203 and the corresponding stiffener 201. In another embodiment, the foot 204 is sufficiently strong to allow mounting of the photovoltaic module 250 (e.g., a solar panel) onto a substrate 206 with sufficient strength to endure mechanical loads. For example, the foot 204 follows a rotation path 205 of the column 203 when the column 203 is unfolded. In another example, the rotation path 205 corresponds to an angle difference β, which represents the maximum range of rotation for the column 203. In another example, each of the one or more stiffeners 201 includes one or more cutouts to allow for physical presence of the foot 204.

As shown in FIG. 2B, the column 203 and the foot 204 have been rotated about the corresponding axis of the rotatable component 202, and the feet 204 is attached to the substrate 206. For example, the foot 204 is attached to the substrate 206 with one or more adhesive materials, such as a construction adhesive material (e.g., a two-part anchoring epoxy). In another example, the foot 204 is attached to the substrate 106 by one or more construction mechanisms, such as one or more bolts, one or more screws, and/or one or more other anchors. In yet another example, the foot 204 is attached to the substrate 106 by pushing the foot 204 into the pliable concrete of the substrate 206 before the pliable concrete hardens.

According to one embodiment, the column 203 interacts with one or more mechanical stops on the corresponding stiffener 201 to maintain a desired angle between the column 203 and the stiffener 201. For example, the one or more mechanical stops on the stiffener 201 include one or more screws, one or more cotter pins, one or more rivets, and/or one or more bent portions of the stiffener 201. In another example, the one or more stiffeners 201 are electrically bonded to each other. In yet another example, the column 203 is electrically bonded to another column and/or to the one or more stiffeners 201.

According to another embodiment, the column 203 is sufficiently strong to support certain mechanical forces including the weight of the photovoltaic module 250 (e.g., a solar panel), snow load on the photovoltaic module 250, positive wind load on the photovoltaic module 250, and/or negative wind load on the photovoltaic module 250. For example, the mechanical forces are up to 5400 pascal (Pa) downward and 2400 Pa upward in addition to gravitational load (e.g., the weight of the solar panel 250).

According to certain embodiments, the column 203 is sufficiently long to perform one or more of the following functions:
 (a) support the photovoltaic module 250 (e.g., a solar panel) at the desired tilt angle above the substrate 206;
 (b) allow airflow behind the photovoltaic module 250 (e.g., a solar panel) for cooling the photovoltaic module 250 during operation;
 (c) allow height above the substrate 206 for vegetation to grow without shading the photovoltaic module 250 (e.g., a solar panel); and/or
 (d) allow flood water to flow under the photovoltaic module 250 (e.g., a solar panel).

According to some embodiments, the column 203 is composed of polymer and/or metal. For example, the column 203 is coated with one or more protective coatings (e.g., a protective coating that is durable outdoors for 20 years or more). In another example, the column 203 is coated for electrical safety with one or more non-conductive materials (e.g., PVC and/or EPDM).

Figure 3:
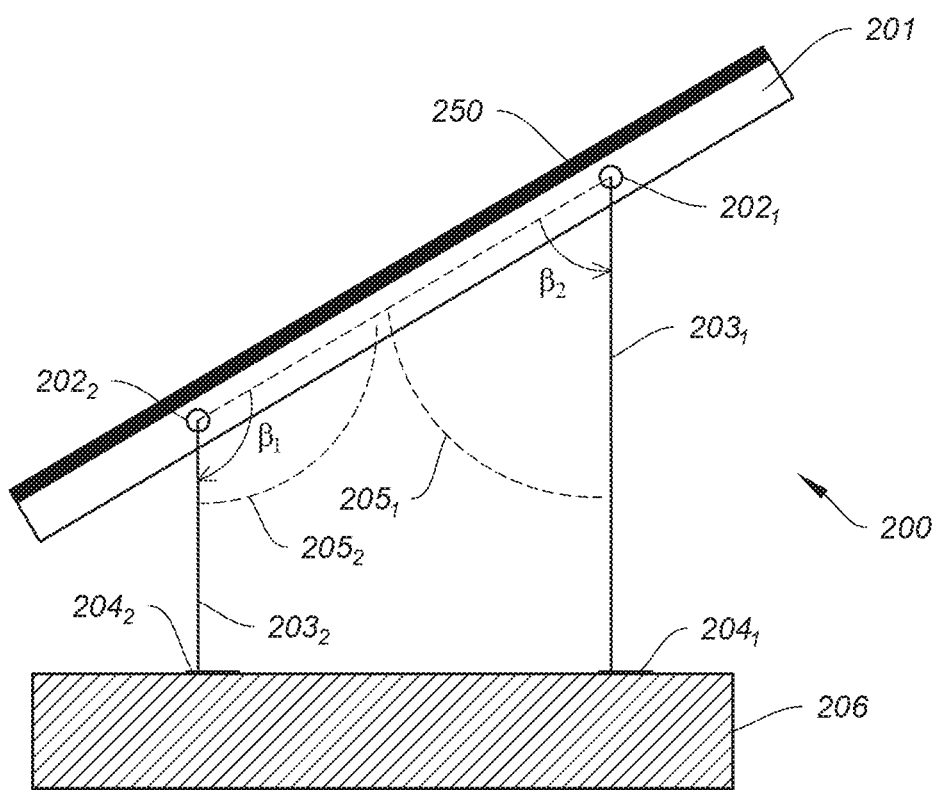
FIG. 3 is a simplified diagram showing the rotatable support system 200 for mounting one or more photovoltaic modules in a unfolded and mounted position according to another embodiment of the present invention.
Figure 4:
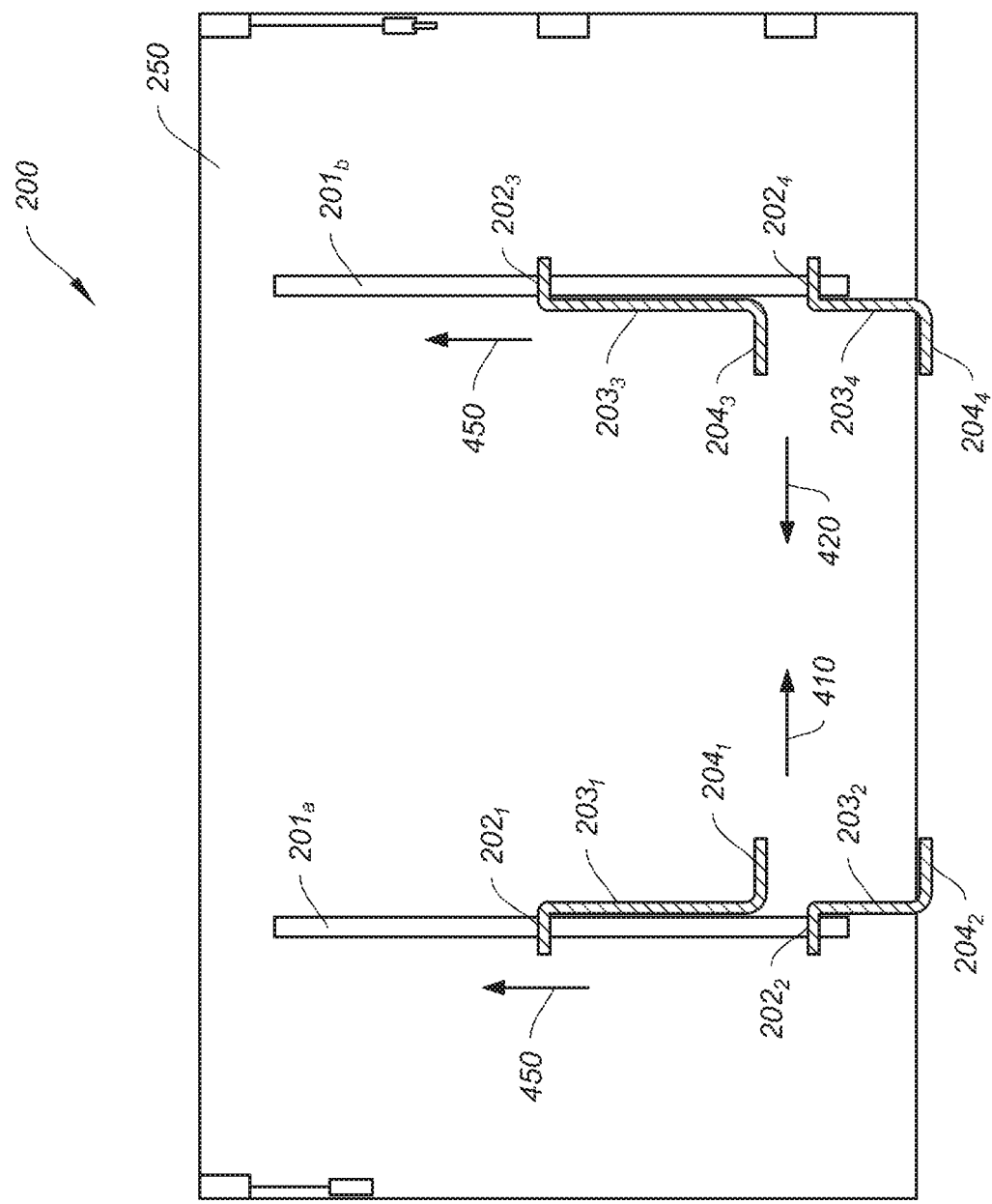
FIG. 4 is a simplified diagram showing a top view of the rotatable support system 200 for mounting one or more photovoltaic modules in a folded position according to yet another embodiment of the present invention.

As discussed above and further emphasized here, FIGS. 2A-2B are merely examples, which should not unduly limit the scope of the claims. One of ordinary skill in the art would recognize many variations, alternatives, and modifications. For example, the rotatable support system 200 includes at least two spacers as shown in FIG. 3. In another example, the rotatable support system 200 includes at least two stiffeners 201 and at least four spacers as shown in FIG. 4 and/or FIG. 5.

FIG. 3 is a simplified diagram showing the rotatable support system 200 for mounting one or more photovoltaic modules in a unfolded and mounted position according to another embodiment of the present invention. This diagram is merely an example, which should not unduly limit the scope of the claims. One of ordinary skill in the art would recognize many variations, alternatives, and modifications.

As shown in FIG. 3, the rotatable support system 200 includes one or more stiffeners 201 and at least two spacers. In one embodiment, the rotatable support system 200 is configured to support the photovoltaic module 250 (e.g., a solar panel). In another embodiment, each of the two spacers includes a rotatable component 202, a column 203, and a foot 204 according to one embodiment. For example, the column 203 and the foot 204 of the same spacer form a T shape. In another example, the columns 203 and the feet 204 have been rotated about the corresponding axes of the rotatable components 202 respectively. In yet another example, the feet 204 are attached to the substrate 206.

Also, as shown in FIG. 3, one of the two spacers includes the rotatable component $202_1$, the column $203_1$, and the foot $204_1$, and the other of the two spacers includes the rotatable component $202_2$, the column $203_2$, and the foot $204_2$. In one embodiment, the foot $204_1$ follows a rotation path $205_1$ of the column $203_1$ when the column $203_1$ is unfolded. For example, the rotation path $205_1$ corresponds to an angle difference $\beta_1$, which represents the maximum range of rotation for the column $203_1$. In another embodiment, the foot $204_2$ follows a rotation path $205_2$ of the column $203_2$ when the column $203_2$ is unfolded. For example, the rotation path $205_2$ corresponds to an angle difference $\beta_2$, which represents the maximum range of rotation for the column $203_2$. In another example, the angle difference $\beta_1$ and the angle difference $\beta_2$ are different in magnitude.

As discussed above and further emphasized here, FIG. 3 is merely an example, which should not unduly limit the scope of the claims. One of ordinary skill in the art would recognize many variations, alternatives, and modifications. For example, the angle difference $\beta_1$ and the angle difference $\beta_2$ are the same in magnitude.

FIG. 4 is a simplified diagram showing a top view of the rotatable support system 200 for mounting one or more photovoltaic modules in a folded position according to yet another embodiment of the present invention. This diagram is merely an example, which should not unduly limit the scope of the claims. One of ordinary skill in the art would recognize many variations, alternatives, and modifications.

As shown in FIG. 4, the rotatable support system 200 includes two stiffeners 201 and four spacers. For example, the rotatable support system 200 is configured to support the photovoltaic module 250 (e.g., a solar panel). In another example, each of the two stiffeners 201 is attached to two of the four spacers. In yet another example, each of the four spacers includes a rotatable component 202, a column 203, and a foot 204.

In one embodiment, the column 203 and the foot 204 of the same spacer are configured to rotate around (e.g., perpendicularly to) the axis of the rotatable component 202 that is attached to the corresponding stiffener 201. For example, the corresponding stiffener 201 extends in a direction 450, and the axis of the rotatable component 202 is perpendicular to the corresponding direction 450. In another embodiment, the column 203 and the foot 204 of the same spacer form an L shape. For example, the two feet 204 of the two spacers that are attached to the same stiffener 201 points to the same direction.

Also, as shown in FIG. 4, the two stiffeners 201 include the stiffener $201_a$ and the stiffener $201_b$. For example, the stiffener $201_a$ is attached to the two spacers, one of which includes the rotatable component $202_1$, the column $203_1$, and the foot $204_1$ and the other of which includes the rotatable component $202_2$, the column $203_2$, and the foot $204_2$. In another example, the stiffener $201_b$ is attached to the two spacers, one of which includes the rotatable component $202_3$, the column $203_3$, and the foot $204_3$ and the other of which includes the rotatable component $202_4$, the column $203_4$, and the foot $204_4$.

In one embodiment, the columns $203_1$, $203_2$, $203_3$, and $203_4$ correspond to a first maximum range of rotation, a second maximum range of rotation, a third maximum range of rotation, and a fourth maximum range of rotation, respectively. For example, the first maximum range of rotation and the third maximum range of rotation are the same in magnitude, and the second maximum range of rotation and the fourth maximum range of rotation are the same in magnitude. In another example, the first maximum range of rotation and the second maximum range of rotation are the same in magnitude, and the third maximum range of rotation and the fourth maximum range of rotation are the same in magnitude. In yet another example, the first maximum range of rotation and the second maximum range of rotation are different in magnitude, and the third maximum range of rotation and the fourth maximum range of rotation are different in magnitude.

In another embodiment, the columns $203_1$ and $203_2$ are different in length, the columns $203_3$ and $203_4$ are different in length, the columns $203_1$ and $203_3$ are the same in length, and the columns $203_2$ and $203_4$ are the same in length. In yet another embodiment, the column $203_1$ and the foot $204_1$ are configured to form a first L shape, the column $203_2$ and the foot $204_2$ are configured to form a second L shape, the column $203_3$ and the foot $204_3$ are configured to form a third L shape, and the column $203_4$ and the foot $204_4$ are configured to form a fourth L shape. For example, the feet $204_1$ and $204_2$ point to a direction 410, and the feet $204_3$ and $204_4$ point to a direction 420. In another example, the directions 410 and 420 are opposite to each other.

Figure 5:
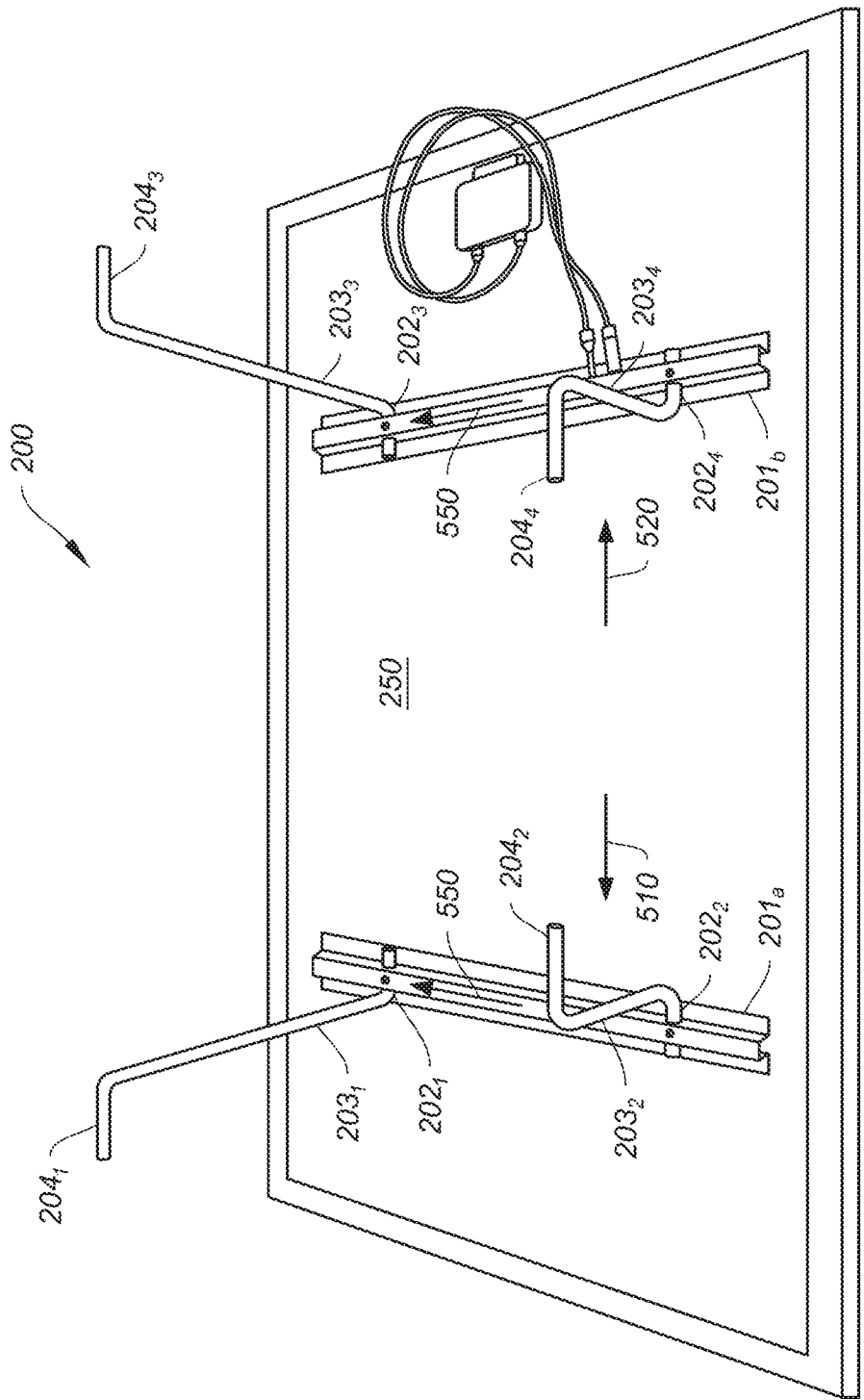
FIG. 5 is a simplified diagram showing the rotatable support system 200 for mounting one or more photovoltaic modules in an unfolded position according to yet another embodiment of the present invention.

FIG. 5 is a simplified diagram showing the rotatable support system 200 for mounting one or more photovoltaic modules in an unfolded position according to yet another embodiment of the present invention. This diagram is merely an example, which should not unduly limit the scope of the claims. One of ordinary skill in the art would recognize many variations, alternatives, and modifications.

As shown in FIG. 5, the rotatable support system 200 includes two stiffeners 201 and four spacers. For example, the rotatable support system 200 is configured to support the photovoltaic module 250 (e.g., a solar panel). In another example, each of the two stiffeners 201 is attached to two of the four spacers. In yet another example, each of the four spacers includes a rotatable component 202, a column 203, and a foot 204. In one embodiment, the column 203 and the foot 204 of the same spacer are configured to rotate about the axis of the rotatable component 202 that is attached to the corresponding stiffener 201. For example, the corresponding stiffener 201 extends in a direction 550, and the axis of the rotatable component 202 is perpendicular to the corresponding direction 550. In another embodiment, the column 203 and the foot 204 of the same spacer form an L shape. For example, the two feet 204 of the two spacers that are attached to the same stiffener 201 points to two different directions (e.g., opposite directions).

Also, as shown in FIG. 5, the two stiffeners 201 include the stiffener $201_a$ and the stiffener $201_b$. For example, the stiffener $201_a$ is attached to the two spacers, one of which includes the rotatable component $202_1$, the column $203_1$, and the foot $204_1$ and the other of which includes the rotatable component $202_2$, the column $203_2$, and the foot $204_2$. In another example, the stiffener $201_b$ is attached to the two spacers, one of which includes the rotatable component $202_3$, the column $203_3$, and the foot $204_3$ and the other of which includes the rotatable component $202_4$, the column $203_4$, and the foot $204_4$.

In one embodiment, the columns $203_1$, $203_2$, $203_3$, and $203_4$ correspond to a first maximum range of rotation, a second maximum range of rotation, a third maximum range of rotation, and a fourth maximum range of rotation, respectively. For example, the first maximum range of rotation and the third maximum range of rotation are the same in magnitude, and the second maximum range of rotation and the fourth maximum range of rotation are the same in magnitude. In another example, the first maximum range of rotation and the second maximum range of rotation are the same in magnitude, and the third maximum range of rotation and the fourth maximum range of rotation are the same in magnitude. In yet another example, the first maximum range of rotation and the second maximum range of rotation are different in magnitude, and the third maximum range of rotation and the fourth maximum range of rotation are different in magnitude.

In another embodiment, the columns $203_1$ and $203_2$ are different in length, the columns $203_3$ and $203_4$ are different in length, the columns $203_1$ and $203_3$ are the same in length, and the columns $203_2$ and $203_4$ are the same in length. In yet another embodiment, the column $203_1$ and the foot $204_1$ are configured to form a first L shape, the column $203_2$ and the foot $204_2$ are configured to form a second L shape, the column $203_3$ and the foot $204_3$ are configured to form a third L shape, and the column $203_4$ and the foot $204_4$ are configured to form a fourth L shape. For example, the feet $204_1$ and $204_4$ point to a direction 510, and the feet $204_2$ and $204_3$ point to a direction 520. In another example, the directions 510 and 520 are opposite to each other.

As discussed above and further emphasized here, FIGS. 4 and 5 are merely examples, which should not unduly limit the scope of the claims. One of ordinary skill in the art would recognize many variations, alternatives, and modifications.

For example, the column $203_1$ and the foot $204_1$ are configured to form a first T shape, the column $203_2$ and the foot $204_2$ are configured to form a second T shape, the column $203_3$ and the foot $204_3$ are configured to form a third T shape, and the column $203_4$ and the foot $204_4$ are configured to form a fourth T shape.

FIG. 6A is a simplified diagram showing a top view of the stiffener 201, FIG. 6B is a simplified diagram showing a cross-section view of the stiffener 201, and FIG. 6C is a simplified diagram showing a side view of the stiffener 201 as part of the rotatable support system 200 for mounting one or more photovoltaic modules according to certain embodiments of the present invention. These diagrams are merely examples, which should not unduly limit the scope of the claims. One of ordinary skill in the art would recognize many variations, alternatives, and modifications.

As shown in FIG. 6B, the stiffener 201 includes sections 610, 612, 620, 622, and 630. For example, the section 620 is substantially perpendicular to the section 610, and the section 622 is substantially perpendicular to the section 612. In another example, the section 630 is substantially parallel with the sections 610 and 612. In yet another example, the sections 610 and 612 are configured to be in contact (e.g., in direct contact) with the photovoltaic module 250 (e.g., a solar panel), and the section 630 is configured to be located a distance (e.g., a distance 632) away from the photovoltaic module 250. As shown in FIG. 6A, the section 630 includes two holes 640 and 642, and as shown in FIG. 6C, the sections 620 and 622 each include two holes 650 and 652.

Figure 7A:
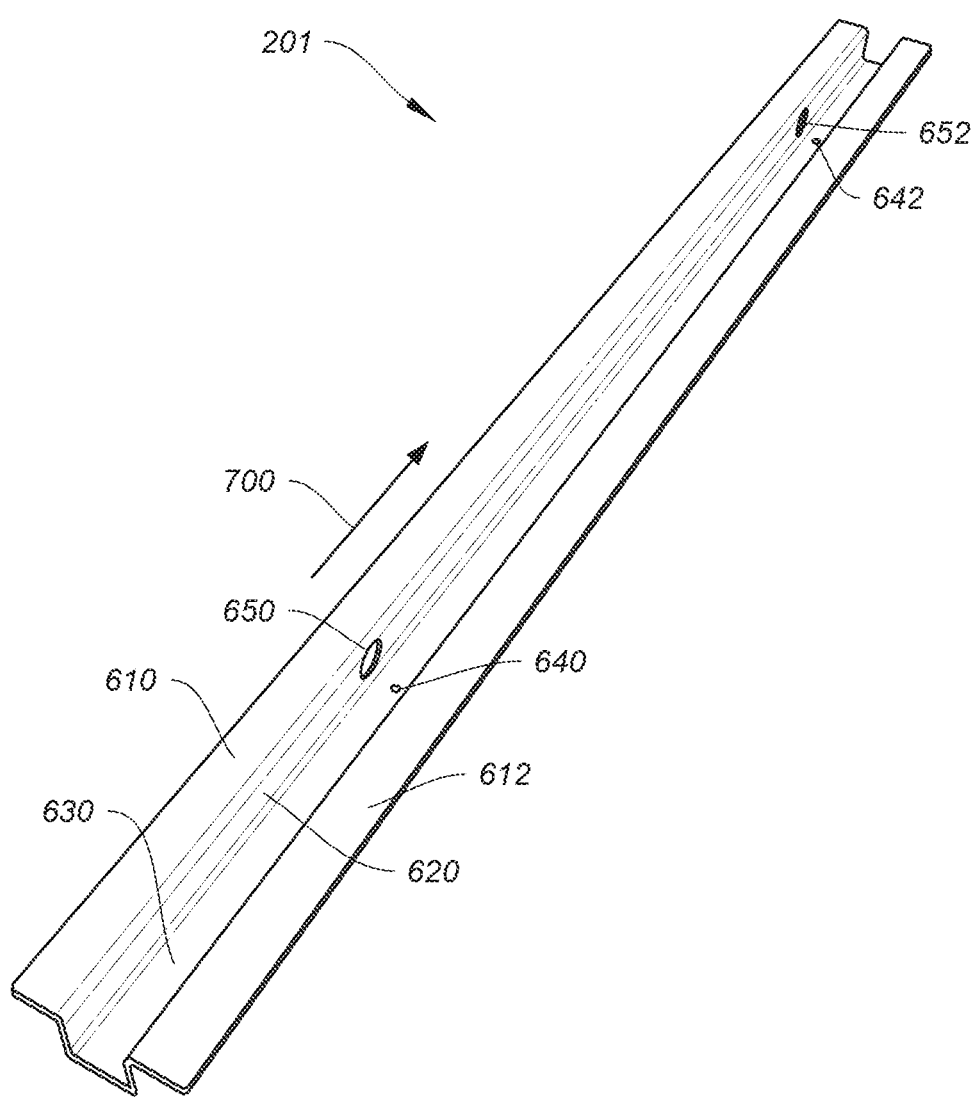
FIGS. 7A-7B are simplified diagrams showing the stiffener as part of the rotatable support system for mounting one or more photovoltaic modules according to some embodiments of the present invention.
Figure 7B:
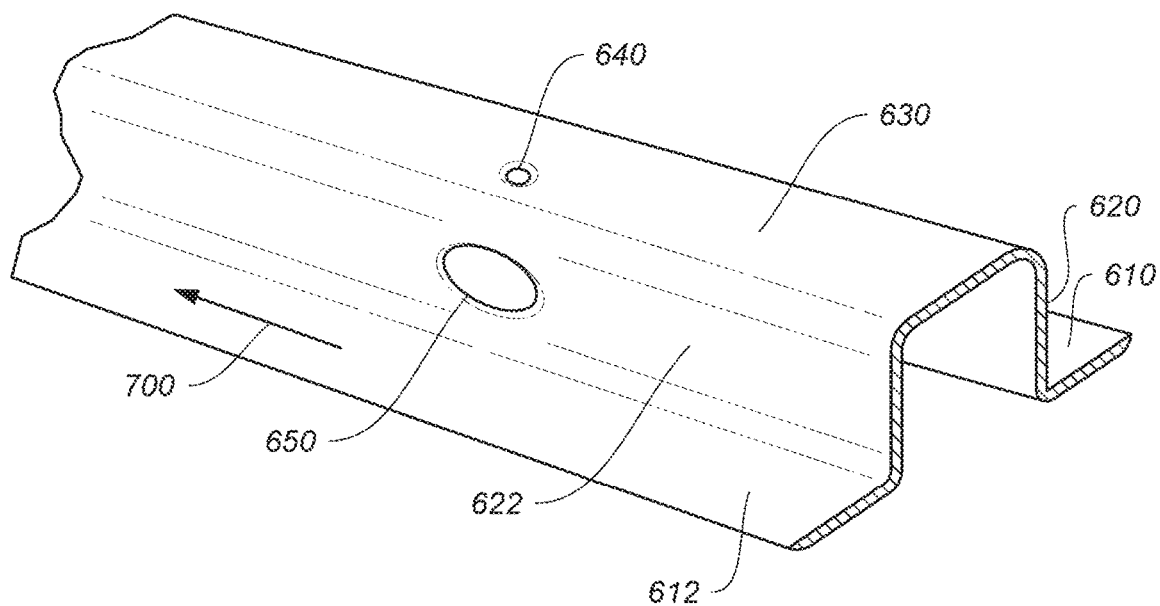

FIGS. 7A-7B are simplified diagrams showing the stiffener 201 as part of the rotatable support system 200 for mounting one or more photovoltaic modules according to some embodiments of the present invention. These diagrams are merely examples, which should not unduly limit the scope of the claims. One of ordinary skill in the art would recognize many variations, alternatives, and modifications.

As shown in FIGS. 7A-7B, the sections 610, 612, 620, 622, and 630 all extend in a direction 700. For example, the center of the hole 650 of the section 620, the center of the hole 640 of the section 630, and the center of the hole 650 of the section 622 are located substantially on a plane that is perpendicular to the direction 700. In another example, the center of the hole 652 of the section 620, the center of the hole 642 of the section 630, and the center of the hole 652 of the section 622 are located substantially on a plane that is perpendicular to the direction 700.

FIGS. 8A-8C are simplified diagrams showing side views of the spacer as part of the rotatable support system 200 for mounting one or more photovoltaic modules according to certain embodiments of the present invention, and FIGS. 9A-9C are simplified diagrams showing side views of the spacer as part of the rotatable support system 200 for mounting one or more photovoltaic modules according to some embodiments of the present invention. These diagrams are merely examples, which should not unduly limit the scope of the claims. One of ordinary skill in the art would recognize many variations, alternatives, and modifications.

As shown in FIGS. 8A-8C and/or FIGS. 9A-9C, each spacer includes the rotatable component 202, the column 203, and the foot 204. According to one embodiment, the rotatable component 202 is substantially parallel with the foot 204. For example, the column 203 is substantially perpendicular to the rotatable component 202 and the foot 204. According to another embodiment, each of the rotatable component 202, the column 203, and the foot 204 includes a hollow tube. For example, the rotatable component 202 includes a hollow tube with a groove 810.

FIG. 10 is a simplified diagram showing the groove 810 of the rotatable component 202 as part of the rotatable support system 200 for mounting one or more photovoltaic modules according to one embodiment of the present invention. This diagram is merely an example, which should not unduly limit the scope of the claims. One of ordinary skill in the art would recognize many variations, alternatives, and modifications. As shown in FIG. 9, the groove 810 has a length 1010 and a width 1020.

Referring to FIGS. 7A-7B, the rotatable component 202 is configured to be inserted into one of the hole 650 of the section 620 or the hole 650 of the section 622, and to extend through the other of the hole 650 of the section 620 or the hole 650 of the section 622 according to one embodiment. According to one embodiment, after the insertion, the groove 810 of the rotatable component 202 (e.g., the groove 810 of the hollow tube) is aligned with the hole 640 of the section 630. For example, the shank of a rivet is inserted through the hole 640 of the section 630 and the groove 810 of the rotatable component 202, and the rivet further includes a first head and a second head. In another example, the fully formed second head of the rivet is wider than the width 1020 of the groove 810, and the groove 810 and the hole 640 are confined between the first head and the second head of the rivet. As shown in FIG. 5, the spacer of the rotatable support system 200 is configured to rotate along the length 1010 of the groove 810, as further shown in FIG. 2A, FIG. 2B, and/or FIG. 3. For example, the length 1010 of the groove 810 corresponds to the maximum range of rotation for the column 203.

FIG. 11 is a simplified diagram showing the rotatable support system 200 for mounting one or more photovoltaic modules in a folded position according to yet another embodiment of the present invention. This diagram is merely an example, which should not unduly limit the scope of the claims. One of ordinary skill in the art would recognize many variations, alternatives, and modifications.

As shown in FIG. 11, the rotatable support system 200 includes two stiffeners 201 and two spacers. For example, the rotatable support system 200 is configured to support the photovoltaic module 250 (e.g., a solar panel). In another example, each of the two stiffeners 201 is attached to one of the two spacers. In yet another example, each of the two spacers includes a rotatable component 202, a column 203, and a foot 204. In one embodiment, the column 203 and the foot 204 of the same spacer are configured to rotate about the axis of the rotatable component 202 that is attached to the corresponding stiffener 201. For example, the corresponding stiffener 201 extends in a direction 1100, and the axis of the rotatable component 202 is parallel with the corresponding direction 1100. In another embodiment, the column 203 and the foot 204 of the same spacer form a T shape.

FIGS. 12A-12B are simplified diagrams showing the spacer as part of the rotatable support system 200 for mounting one or more photovoltaic modules according to certain embodiments of the present invention. These diagrams are merely examples, which should not unduly limit the scope of the claims. One of ordinary skill in the art would recognize many variations, alternatives, and modifications.

As shown in FIGS. 12A-12B, each spacer includes the rotatable component 202, the column 203, and the foot 204. For example, the rotatable component 202 includes a hole. In another example, the column 203 is substantially perpendicular to the foot 204. In yet another example, the column 203 and the foot 204 of the same spacer form a T shape. In yet another example, the spacer as shown in FIGS. 12A-12B is used as part of the rotatable support system 200 as shown in FIG. 11.

FIG. 13 shows simplified diagrams for various shapes of the stiffener 201 as part of the rotatable support system 200 for mounting one or more photovoltaic modules according to certain embodiments of the present invention. These diagrams are merely examples, which should not unduly limit the scope of the claims. One of ordinary skill in the art would recognize many variations, alternatives, and modifications.

In one embodiment, the shapes of the stiffener 201 include one or more ribs to distance material from the neutral axis of the photovoltaic module 250 (e.g., a solar panel). In another embodiment, the stiffener 201 provides sufficient stiffness to allow the photovoltaic module 250 (e.g., a solar panel) to endure mechanical loading without damage (e.g., without damage to the front glass or to the active material of the solar panel). In yet another embodiment, the stiffener 201 is thin in order to achieve high packing density. In yet another embodiment, the stiffener 201 extends from the back of the photovoltaic module 250 (e.g., a solar panel) by less than 50 mm, less than 35 mm, or less than 25 mm.

According to one embodiment, the photovoltaic module 250 (e.g., a solar panel) is supported by one, two, or more stiffeners 201. For example, the frame of the solar panel 250 serves as the stiffener 201. In another example, the one or more stiffeners 201 are attached to the frame of the solar panel 250. In yet another example, the one or more stiffeners 201 are attached to the solar panel 250 with one or more compliant materials. In one embodiment, the one or more compliant materials include silicone adhesive. In another embodiment, the one or more compliant materials are of sufficient thickness to take up differential thermal expansion between the solar panel 250 and the one or more stiffeners 201 and/or between the solar panel 250 and the substrate 206 at both high operating temperature (e.g., the maximum operating temperature) and low operating temperature (e.g., the minimum operating temperature) of the solar panel 250.

FIG. 14 shows simplified diagrams for various shapes of the column 203 as part of the rotatable support system 200 for mounting one or more photovoltaic modules according to some embodiments of the present invention. These diagrams are merely examples, which should not unduly limit the scope of the claims. One of ordinary skill in the art would recognize many variations, alternatives, and modifications. For example, the column 203 has sufficient buckling and tensile strength to support mechanical loads without damage to the photovoltaic module 250 (e.g., a solar panel) and/or to the columns 103. In another example, in the folded position, the column 203 do not extend beyond the height of the one or more stiffeners 201.

FIG. 15 shows simplified diagrams for various shapes of the foot 204 as part of the rotatable support system 200 for mounting one or more photovoltaic modules according to certain embodiments of the present invention. These diagrams are merely examples, which should not unduly limit the scope of the claims. One of ordinary skill in the art would recognize many variations, alternatives, and modifications. For example, the foot 204 has sufficient area to allow for bonds with the substrate 206 of sufficient strength to resist mechanical loads on the photovoltaic module 250 (e.g., a solar panel). In another example, if the foot 204 is attached to the substrate 206 with a design strength of 100 pounds per square inch (psi) and if the maximum mechanical force on each foot is 100 pounds, each foot 204 should be at least one square inch in size.

FIG. 16 is a simplified diagram showing a method for installing the photovoltaic module 250 using the rotatable support system 200 according to an embodiment of the present invention. This diagram is merely an example, which should not unduly limit the scope of the claims. One of ordinary skill in the art would recognize many variations, alternatives, and modifications. The method 1600 for installing the photovoltaic module 250 includes processes 1610, 1620, 1630, 1640, 1650, and 1660.

At the process 1610, one or more stiffeners 201 are attached to the photovoltaic module 250 (e.g., a solar panel). For example, a photovoltaic module is attached to the one or more stiffeners 201. At the process 1620, one or more spacers are attached to the one or more stiffeners 201. For example, each of the one or more spacers includes one or more rotatable components 202 (e.g., one or more rotating joints), one or more columns 203, and one or more feet 204. In another example, the one or more columns 203 are attached to the stiffener 201 through at least one or more rotatable components 202 respectively. In another example, each of the one or more spacers (e.g., each of the one or more columns 203) is placed in the folded position for shipping.

At the process 1630, the photovoltaic module 250 (e.g., a solar panel) is moved with the one or more stiffeners 201 and the one or more spacers to an installation location. For example, the photovoltaic module 250 (e.g., a solar panel) is moved with the rotatable support system 200 to the installation location.

At the process 1640, the one or more spacers are rotated from the folded position to the unfolded position. For example, each column 203 is rotated from the folded position to the unfolded position automatically by the weight of the column 203. In another example, each column 203 is rotated from the folded position towards the unfolded position and is stopped at the unfolded position separated from the folded position by an angle difference, the angle difference representing the maximum range of rotation for the column 203.

At the process 1650, the one or more feet 204 of each of the one or more spacers are attached to a substrate (e.g., the substrate 206). For example, each of the one or more feet 204 is inserted into a groove of the substrate of the substrate 206, and is attached to the substrate 206 within the groove. At the process 1660, the installation of the photovoltaic module 250 (e.g., a solar panel) is completed.

FIGS. 17A-17E are simplified diagrams showing the process 1640 of rotating one or more spacers from folded position to unfolded position and the process 1650 of attaching one or more feet of each of one or more spacers to substrate as parts of the method 1600 for installing the photovoltaic module 250 using the rotatable support system 200 according to certain embodiments of the present invention. These diagrams are merely examples, which should not unduly limit the scope of the claims. One of ordinary skill in the art would recognize many variations, alternatives, and modifications.

Figure 17A:
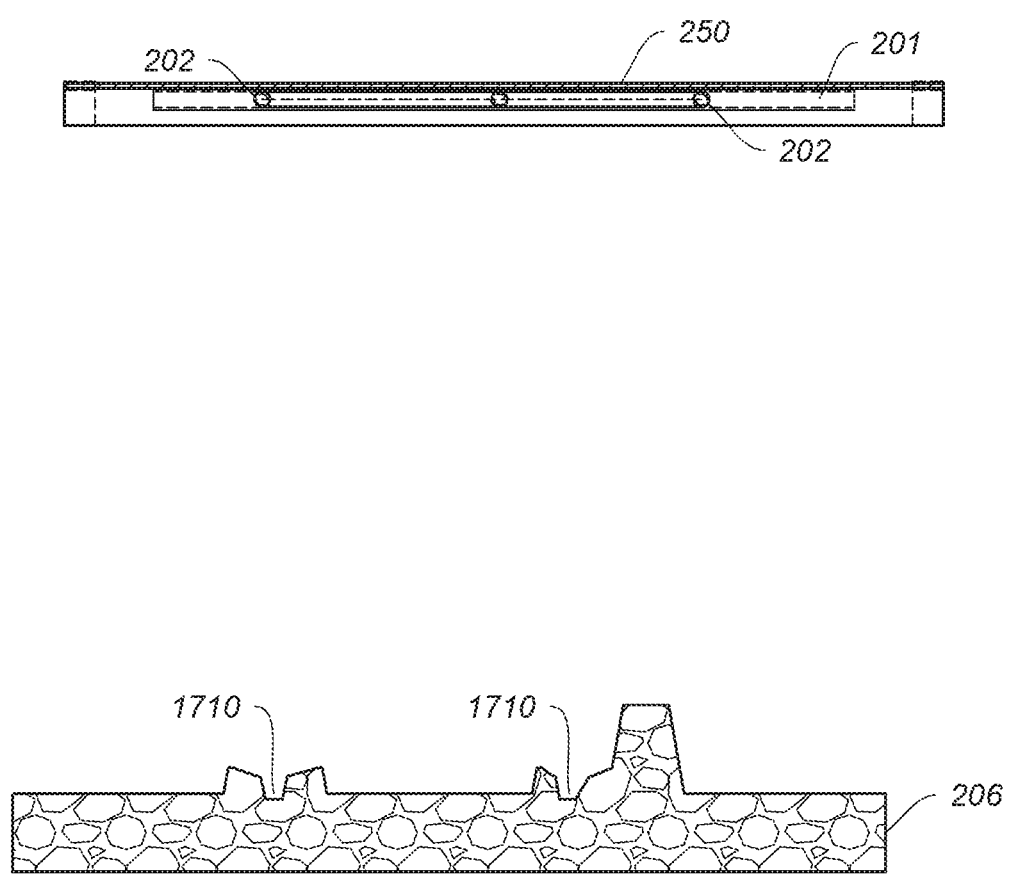
Figure 17B:
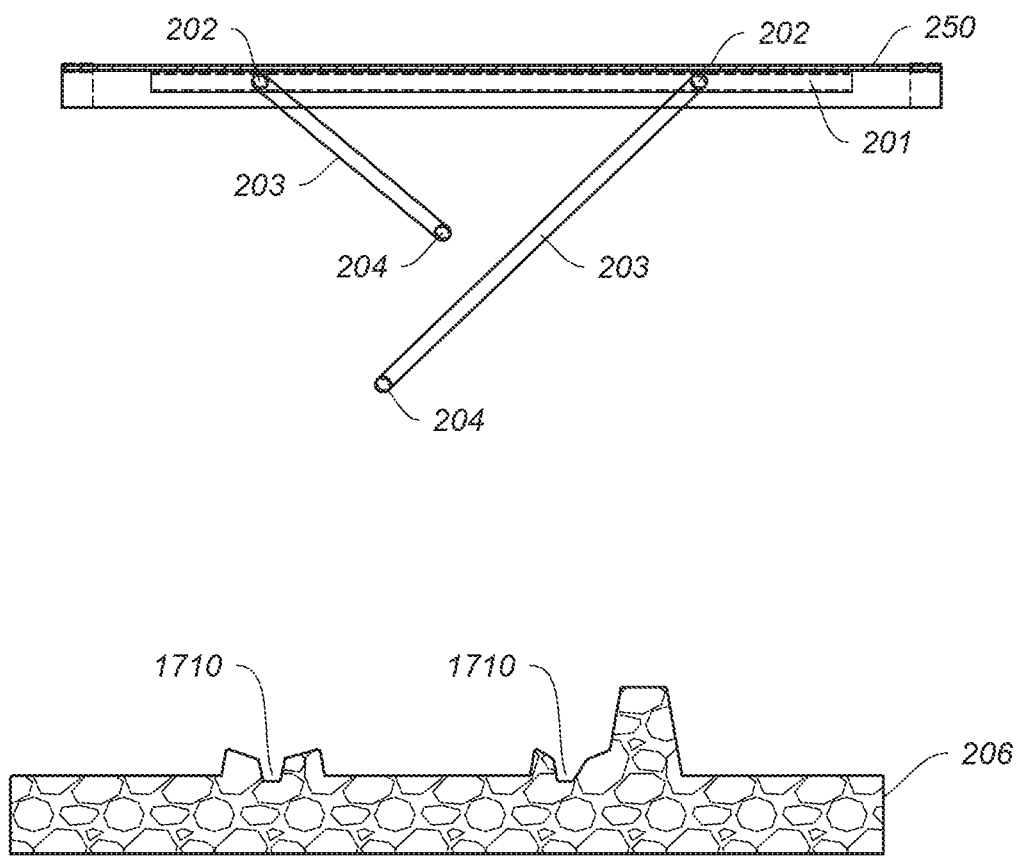
Figure 17C:
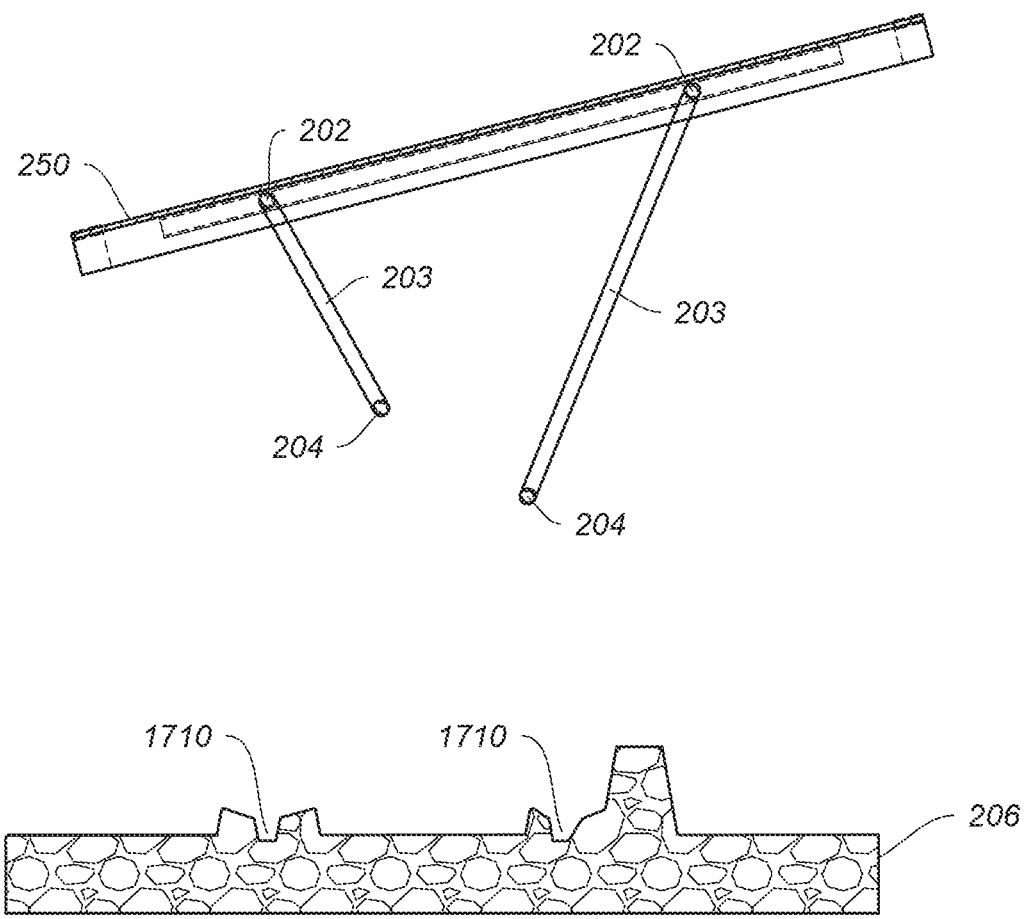
Figure 17D:
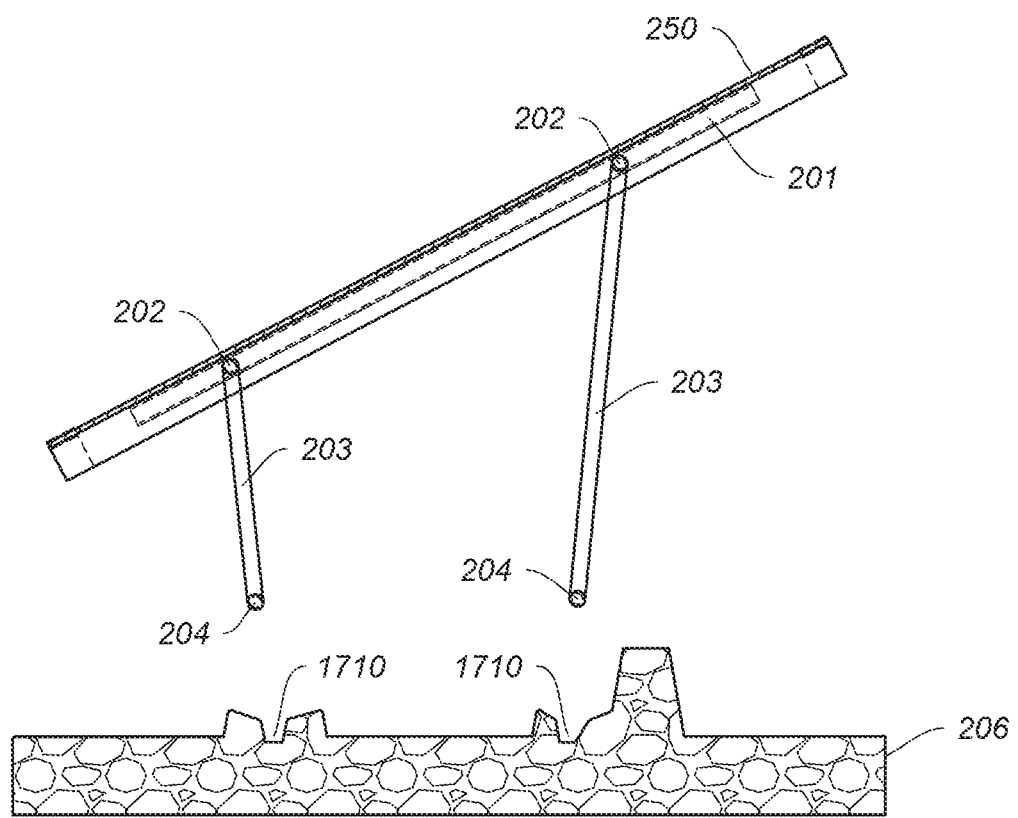
Figure 17E:
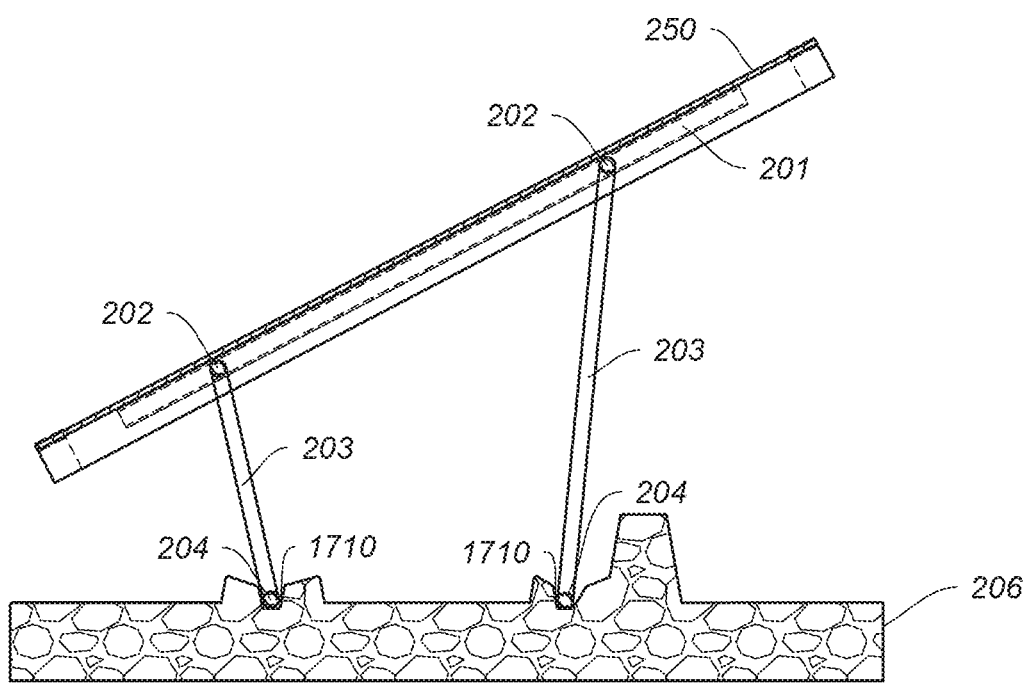

As shown in FIG. 17A, the photovoltaic module 250 (e.g., a solar panel) has arrived at an installation location with the one or more stiffeners 201 and the one or more spacers in the folded position for shipping. As shown in FIGS. 17B-17C, each of the one or more spacers rotates with the weight of the one or more corresponding columns 203 due to gravity. As shown in FIG. 17D, the rotation of each of the one or more spacers stops if the one or more corresponding columns 203 reach the predetermined positions (e.g., the predetermined angles with respect to the corresponding stiffener 201), respectively. As shown in FIG. 17E, for each of the one or more spacers, the one or more corresponding feet 204 are attached to the substrate 206. For example, the substrate 206 includes one or more grooves 1710, and each feet 204 is placed within a corresponding groove 1710 and attached to the substrate 206.

FIG. 18 is a simplified diagram showing the rotatable support system 200 for mounting one or more photovoltaic modules in a unfolded and mounted position according to yet another embodiment of the present invention. This diagram is merely an example, which should not unduly limit the scope of the claims. One of ordinary skill in the art would recognize many variations, alternatives, and modifications.

As shown in FIG. 18, the rotatable support system 200 includes one or more stiffeners 201 and at least four spacers. In one embodiment, the rotatable support system 200 is configured to support the photovoltaic module 250 (e.g., a solar panel). In another embodiment, each of the four spacers includes a rotatable component 202, a column 203, and a foot 204 according to one embodiment. For example, the columns 203 and the feet 204 have been rotated about the corresponding axes of the rotatable components 202 respectively. In another example, the feet 204 are attached to the substrate 206.

In yet another embodiment, the substrate 206 is an extruded concrete slab. For example, one or more features (e.g., one or more grooves) in the concrete slab 206 are configured to assist in locating the proper placement of the one or more columns 203 and/or the one or more feet 204 onto the substrate 206. In another example, one or more features (e.g., one or more grooves) in the concrete slab 206 are configured to provide additional surface area for construction adhesive in order to bond between the substrate 206 and the one or more feet 204. In yet another example, the one or more columns 203 and/or the one or more feet 204 are attached to the substrate 206 by pushing the one or more columns 203 and/or the one or more feet 204 into the pliable concrete of the substrate 206 before the pliable concrete hardens.

FIGS. 19A-19B are simplified diagrams showing the rotatable support system 200 for mounting one or more photovoltaic modules in a unfolded and mounted position as shown in FIG. 2B according to certain embodiments of the present invention. These diagram are merely examples, which should not unduly limit the scope of the claims. One of ordinary skill in the art would recognize many variations, alternatives, and modifications.

Some embodiments of the present invention provide a low profile, rotatable solar panel support system that can meet various requirements of a fixed-tilt solar panel mounting system while reducing installation labor and part count and also improving shipping convenience. For example, the rotatable solar panel support system is shipped to the installation location in a collapsed state, with one or more spacers nominally parallel with the panel and in the plane of the panel stiffeners. In another example, once at the installation location, the one or more spacers are rotated out of the plane of the panel stiffeners to provide support to the panel at the desired angle relative to the horizon. In yet another example, the one or more feet of the one or more spacers are subsequently secured to the base material and the panel installation is complete.

According to another embodiment, a rotatable support system for mounting one or more photovoltaic modules includes a stiffener configured to be attached to the one or more photovoltaic modules, a column connected to the stiffener through at least a rotatable component, and a foot connected to the column. The column is configured to rotate from a folded position towards an unfolded position, and stop at the unfolded position separated from the folded position by an angle difference. The angle difference represents the maximum range of rotation for the column. For example, the rotatable support system is implemented according to at least FIG. 2A, FIG. 2B, FIG. 3, FIG. 4, FIG. 5, FIG. 11, FIG. 18, FIG. 19A, and/or FIG. 19B.

According to yet another embodiment, a rotatable support system for mounting one or more photovoltaic modules includes a first stiffener configured to be attached to a photovoltaic module, a first column connected to the first stiffener through at least a first rotatable component, a first foot connected to the first column, a second column connected to the first stiffener through at least a second rotatable component, a second foot connected to the second column, a second stiffener configured to be attached to the photovoltaic module, a third column connected to the second stiffener through at least a third rotatable component, a third foot connected to the third column, a fourth column connected to the second stiffener through at least a fourth rotatable component, and a fourth foot connected to the fourth column. The first column is configured to rotate from a first folded position towards a first unfolded position, and stop at the first unfolded position separated from the first folded position by a first angle difference. The first angle difference represents the first maximum range of rotation for the first column. Additionally, the second column is configured to rotate from a second folded position towards the second unfolded position, and stop at the second unfolded position separated from the second folded position by a second angle difference. The second angle difference represents the second maximum range of rotation for the second column. Moreover, the third column is configured to rotate from a third folded position towards a third unfolded position, and stop at the third unfolded position separated from the third folded position by a third angle difference. The third angle difference represents the third maximum range of rotation for the third column. Also, the fourth column is configured to rotate from a fourth folded position towards a fourth unfolded position, and stop at the fourth unfolded position separated from the fourth folded position by a fourth angle difference. The fourth angle difference represents the fourth maximum range of rotation for the fourth column. The first column and the second column are different in length, the third column and the fourth column are different in length, the first column and the third column are the same in length, and the second column and the fourth column are the same in length. The first angle difference and the third angle difference are the same in magnitude, and the second angle difference and the fourth angle difference are the same in magnitude. For example, the rotatable support system is implemented according to at least FIG. 3, FIG. 4, FIG. 5, and/or FIG. 18.

According to yet another embodiment, a method for mounting one or more photovoltaic modules includes attaching a photovoltaic module to a stiffener. The stiffener is a part of a rotatable support system further including a column and a foot connected to the column. Additionally, the method includes attaching the column to the stiffener through at least a rotatable component, placing the column in a folded position, moving the photovoltaic module with the rotatable support system to an installation location, rotating the column from the folded position towards an unfolded position, and stopping the column at the unfolded position separated from the folded position by an angle difference. The angle difference represents the maximum range of rotation for the column. Moreover, the method includes attaching the foot to the substrate. For example, the method is implemented according to at least FIG. 16, and/or FIGS. 17A-17E.

Although specific embodiments of the present invention have been described, it will be understood by those of skill in the art that there are other embodiments that are equivalent to the described embodiments. For example, various embodiments and/or examples of the present invention can be combined. Accordingly, it is to be understood that the invention is not to be limited by the specific illustrated embodiments, but only by the scope of the appended claims.

What is claimed is:

1. A support system for a solar panel, the solar panel having a front surface and a back surface parallel to the front surface, the support system comprising:
    a first stiffener coupled to the back surface of the solar panel;
    a second stiffener coupled to the back surface of the solar panel;
    a first column coupled to the first stiffener and having a first length;
    a second column coupled to the second stiffener and having the first length;
    a third column coupled to the first stiffener and having a second length that is less than the first length; and
    a fourth column coupled to the second stiffener and having the second length,
    each of the first, second, third, and fourth columns being rotatable from a respective folded position to a respective unfolded position in which that column supports the solar panel;
    wherein the first column is non-parallel to the first stiffener in the folded position, and wherein the second column is non-parallel to the second stiffener in the folded position.

2. The support system of claim 1, further comprising a substrate comprising first and second grooves,
    wherein each of the first, second, third, and fourth columns is connected to a respective foot,
    wherein the respective feet of the first and third columns are disposed within the first groove, and
    wherein the respective feet of the second and third columns are disposed within the second groove.

3. The support system of claim 2, further comprising adhesive respectively adhering the feet of the first and third columns within the first groove and adhering the feet of the second and fourth columns within the second groove.

4. The support system of claim 2, wherein each of the feet of the first, second, third, and fourth columns comprises at least one aperture defined therein.

5. The support system of claim 2, wherein the substrate comprises a concrete slab.

6. The support system of claim 1, wherein the first column is disposed at a first non-perpendicular angle relative to the first stiffener in the unfolded position, and
    wherein the third column is disposed at the first non-perpendicular angle relative to the second stiffener in the unfolded position.

7. The support system of claim 6, wherein the second column is disposed at a second non-perpendicular angle relative to the first stiffener in the unfolded position, and
    wherein the fourth column is disposed at the second non-perpendicular angle relative to the second stiffener in the unfolded position,
    the first non-perpendicular angle being different than the second non-perpendicular angle.

8. The support system of claim 1, wherein the first and third columns are rotatable relative to one another, and wherein the second and fourth columns are rotatable relative to one another.

9. The support system of claim 1, wherein each of the first and second stiffeners comprises first and second sections each coupled to the back surface of the solar panel, and a third section disposed between the first and second sections and spaced apart from the back surface of the solar panel.

10. A method for supporting a solar panel, the solar panel having a front surface and a back surface parallel to the front surface, the method comprising:
    coupling a first stiffener to the back surface of the solar panel;
    coupling a second stiffener to the back surface of the solar panel;
    coupling to the first stiffener a first column having a first length;
    coupling to the second stiffener a second column having the first length;
    coupling to the first stiffener a third column having a second length that is less than the first length;
    coupling to the second stiffener a fourth column having the second length; and
    rotating each of the first, second, third, and fourth columns from a respective folded position to a respective unfolded position in which that column supports the solar panel;
    wherein the first column is non-parallel to the first stiffener in the folded position, and wherein the second column is non-parallel to the second stiffener in the folded position.

11. The method of claim 10, wherein each of the first, second, third, and fourth columns is connected to a respective foot, the method further comprising:
    providing a substrate comprising first and second grooves,
    disposing the respective feet of the first and third columns within the first groove, and
    disposing the respective feet of the second and third columns within the second groove.

12. The method of claim 11, further comprising adhering the feet of the first and third columns within the first groove and adhering the feet of the second and fourth columns within the second groove with adhesive.

13. The method of claim 11, wherein each of the feet of the first, second, third, and fourth columns comprises at least one aperture defined therein.

14. The method of claim 11, wherein the substrate comprises a concrete slab.

15. The method of claim 10, wherein the first column is disposed at a first non-perpendicular angle relative to the first stiffener in the unfolded position, and
    wherein the third column is disposed at the first non-perpendicular angle relative to the second stiffener in the unfolded position.

16. The method of claim 15, wherein the second column is disposed at a second non-perpendicular angle relative to the first stiffener in the unfolded position, and
    wherein the fourth column is disposed at the second non-perpendicular angle relative to the second stiffener in the unfolded position,
    the first non-perpendicular angle being different than the second non-perpendicular angle.

17. The method of claim 10, wherein the first and third columns are rotatable relative to one another, and wherein the second and fourth columns are rotatable relative to one another.

18. The method of claim 10, wherein each of the first and second stiffeners comprises first and second sections each coupled to the back surface of the solar panel, and a third section disposed between the first and second sections and spaced apart from the back surface of the solar panel.

* * * * *